(12) United States Patent
Rongo

(10) Patent No.: US 6,292,715 B1
(45) Date of Patent: Sep. 18, 2001

(54) ROBOTIC PROCESS PLANNING METHOD AND APPARATUS USING TEMPLATES

(75) Inventor: Robert Rongo, Danville, IN (US)

(73) Assignee: Perry Investments, Inc., Indianapolis, ID (US)

(*) Notice: Subject to any disclaimer, the term of this patent is extended or adjusted under 35 U.S.C. 154(b) by 0 days.

(21) Appl. No.: 09/427,795

(22) Filed: Oct. 27, 1999

Related U.S. Application Data

(60) Provisional application No. 60/105,792, filed on Oct. 27, 1998.

(51) Int. Cl.[7] .................................................. G05B 19/04
(52) U.S. Cl. .......................... 700/249; 700/145; 700/165; 700/173; 700/192; 700/245; 700/257; 700/258; 700/259; 700/260; 700/900; 318/568.1; 318/568.11; 318/568.13; 318/568.14; 701/200
(58) Field of Search ........................................ 700/249, 165, 700/97, 160, 173, 182, 192, 194, 145, 117, 259, 206, 86, 260, 245, 257, 253, 251, 264, 187, 188, 258, 900; 318/568.11, 568.13, 568.1, 568.14; 701/200; 702/95; 706/904

(56) References Cited

U.S. PATENT DOCUMENTS

| | | | |
|---|---|---|---|
| 4,380,696 | 4/1983 | Masaki ................................ | 219/124 |
| 4,757,459 | 7/1988 | Lauchnor et al. .................... | 700/264 |
| 4,761,745 | 8/1988 | Kodaira ............................... | 700/254 |
| 5,006,999 | 4/1991 | Kuno et al. .......................... | 700/253 |
| 5,155,423 | 10/1992 | Karlen et al. ...................... | 318/568.11 |
| 5,208,763 | * 5/1993 | Hong et al. .. | |
| 5,345,540 | 9/1994 | Schleifer et al. ..................... | 700/251 |
| 5,465,221 | * 11/1995 | Merat et al. .......................... | 702/83 |
| 5,467,003 | 11/1995 | Kosaka et al. .................... | 318/568.13 |
| 5,485,552 | 1/1996 | Mizuno et al. ...................... | 700/264 |
| 5,511,147 | 4/1996 | Abdel-Malek ....................... | 700/264 |
| 5,519,814 | 5/1996 | Rodriguez et al. ................. | 700/264 |
| 5,570,458 | 10/1996 | Umeno et al. ....................... | 700/253 |
| 5,586,224 | 12/1996 | Kunii et al. ......................... | 700/260 |
| 5,642,291 | 6/1997 | Prunotto et al. .................... | 700/145 |
| 5,969,973 | * 10/1999 | Bourne et al. ...................... | 700/165 |

FOREIGN PATENT DOCUMENTS

WO-00/25185 * 5/2000 (WO).

OTHER PUBLICATIONS

Prinz et al., CAD–Based Kinematic Modeling to Automated Robot Programming, 1996, IEEE., pp. 99–109.*

Sobn et al., A Unifying Framework for Tolerance Analysis in Sensing, Desgn, and Manufacturing, 1995, IEEE., 2859–2854.*

Kashyap et al., An Intelligent System for Integrating Process Planning and Design, 1998, IEEE., 1297–1299.*

Gu et al., Integration Of Product Desigh And Manufacturing Processes, 1994, Conference: Ottawa, Ont., Canada, Aug. 21–24, pp. 319–324.*

Ronald et al., International Journal of Intelligent Systems, 1990, A Wiley–Interscience, vol. 5, No. 2, pp. 154–181.*

Jun et al., Control Of An Automatomated Machining Workstation, 1987, American Aotomatic Control Council, vol. 3, pp. 1709–1714.*

* cited by examiner

Primary Examiner—William A. Cuchlinski, Jr.
Assistant Examiner—McDieunel Marc
(74) Attorney, Agent, or Firm—Maginot, Addison & Moore

(57) ABSTRACT

A method of generating a robotic process plan for performing a process on a work structure includes a step of receiving input identifying a template corresponding to a plurality of geometric features of the work structure, each geometric feature associated with one or more robotic process elements. The method further includes a step of receiving input associating work structure data with the identified template. The method also includes a step of generating the robotic process plan based on the associated work structure data and the robotic process elements associate with the template.

21 Claims, 19 Drawing Sheets

| PROGRAM LIST | JOB LIST | PATH LIST |
|---|---|---|
| START PROG 1 | | |
| DEFINE PROG 1 | | |
| EXT_INDEX 1 MOVEA POSITION VEL | | |
| EXECUTE JOB A | DEFINE A | |
| | TOOL SELECT 1 | |
| | EXECUTE PATH 1 | DEFINE PATH 1 |
| | | ... |
| | | END PATH 1 |
| | ... | |
| | EXECUTE PATH 3 | DEFINE PATH 3 |
| | | ... |
| | | END PATH 3 |
| | TOOL SELECT 2 | |
| | EXECUTE PATH 4 | DEFINE PATH 4 |
| | | ... |
| | | END PATH 4 |
| | ... | |
| | END JOB A | |
| EXT_INDEX 1 MOVEA POSITION VEL | | |
| EXECUTE JOB B | DEFINE JOB B | |
| | EXECUTE PATH m | |
| | EXECUTE PATH m+1 | |
| | END JOB B | |
| | | |
| END PROG 1 | | |

Fig. 13

ROBOTIC PROCESS PLANNING METHOD AND APPARATUS USING TEMPLATES

This application claims the benefit of U.S. Provisional Patent Application Ser. No. 60/105,792, filed Oct. 27, 1998.

FIELD OF THE INVENTION

The present invention relates generally to the field of robotic processes, and more particularly, to process planning for robotic processes.

BACKGROUND OF THE INVENTION

Robotic devices have attained widespread use in the manufacturing environment in both assembly processes and work processes. Common types of robotic assembly processes include the population of printed circuit boards and other pick and place operations. Common types of work processes include robotic welding, cutting, grinding, glueing and the like.

Robotic devices require programming to perform the movements to carry out such processes. One method of programming includes manipulation of a robotic device with a numerical controller to step through an operation. In particular, an operator uses a numerical controller to slowly step the robotic device through the operations that the robotic device will perform on a repetitive basis. The operator then stores the appropriate set of steps for later execution.

To carry out the numerical controller programming, the operator typically sets up a work cell that includes the robot to be used, a sample work piece, and appropriate fixturing. The above-described programming technique is adequate for highly repetitive operations. Such as small electronic component manufacturing, automotive manufacturing and the like. However, the numerical programming technique has significant drawbacks in less repetitive operations, for example, large structural operations.

In particular, many large structural operations, such as ship, bridge, building and aircraft construction do not have assembly and work processes that are highly repetitive. As a result, the cost associated with developing a work cell numerical programming environment for robotic processes in such large structural operations cannot be easily recovered. Because robotic process programming is not cost effective, potentially dangerous and costly manual labor is often selected for work processes in large structural operations.

One potential solution to the problems presented by maintaining a work cell to develop numerical programming for a robotic process is the use of offline robotic programming systems. Offline robotic programming systems allow the movement of the robot, or robotic path plan, to be developed without actual movement of the robot. One method of carrying out offline robotic programming is to use computer simulation to simulate the work cell programming environment. In particular, such a method allows the operator to step through a robotic program using a computer-simulated robot and a computer-simulated work piece. The offline robotic programming system therefore does not require the manipulation of an actual workpiece in its associated fixturing devices.

Another offline robotic programming system is shown in U.S. Pat. No. 5,511,147 to Abdel-Malek. U.S. Pat. No. 5,511,147 shows a system in which an operator defines points in Cartesian space that represent travel points of the robot in a process. In other words, the operator defines the robotic path plan on a computer file by pointing to various start and stop points. The computer system then automatically generates the robotic kinematics, or in other words, converts the robotic path plan from Cartesian space to robotic space.

The above systems, while somewhat automating the process of robotic path planning, still fail to solve adequately the problems posed by large structural operations having low process repetition rates. Accordingly, there exists a need for an offline planning system and method that increases the automation of the generation of robotic process programs.

SUMMARY OF THE INVENTION

The present invention fulfills the above need, as well as others, by providing a robotic process planning system that allows for the selection of a predefined template comprising a plurality of geometric process elements. Data pertaining to the work piece (for example, structural data) is then associated with the template to define at least a portion of a robotic process plan. In this manner, multiple process elements of a robotic process plan may be automatically generated using a predefined template, thereby increasing the automation of the robotic process planning generation system.

A first embodiment of the present invention is a method of generating a robotic process plan for performing a process on a work structure. The method includes a step of receiving input identifying a template corresponding to a plurality of geometric features of the work structure, each geometric feature associated with one or more robotic process elements. The method further includes a step of receiving input associating work structure data with the identified template. The method also includes a step of generating the robotic process plan based on the associated work structure data and the robotic process elements associate with the template.

The above-described features and advantages of the present invention, as well as others, will become more readily apparent to those of ordinary skill in the art by reference to the following detailed description and accompanying drawings.

BRIEF DESCRIPTION OF THE DRAWINGS

FIGS. 6–13 show various work piece diagrams that illustrate an exemplary embodiment of the present invention.

DETAILED DESCRIPTION

Figure 1:
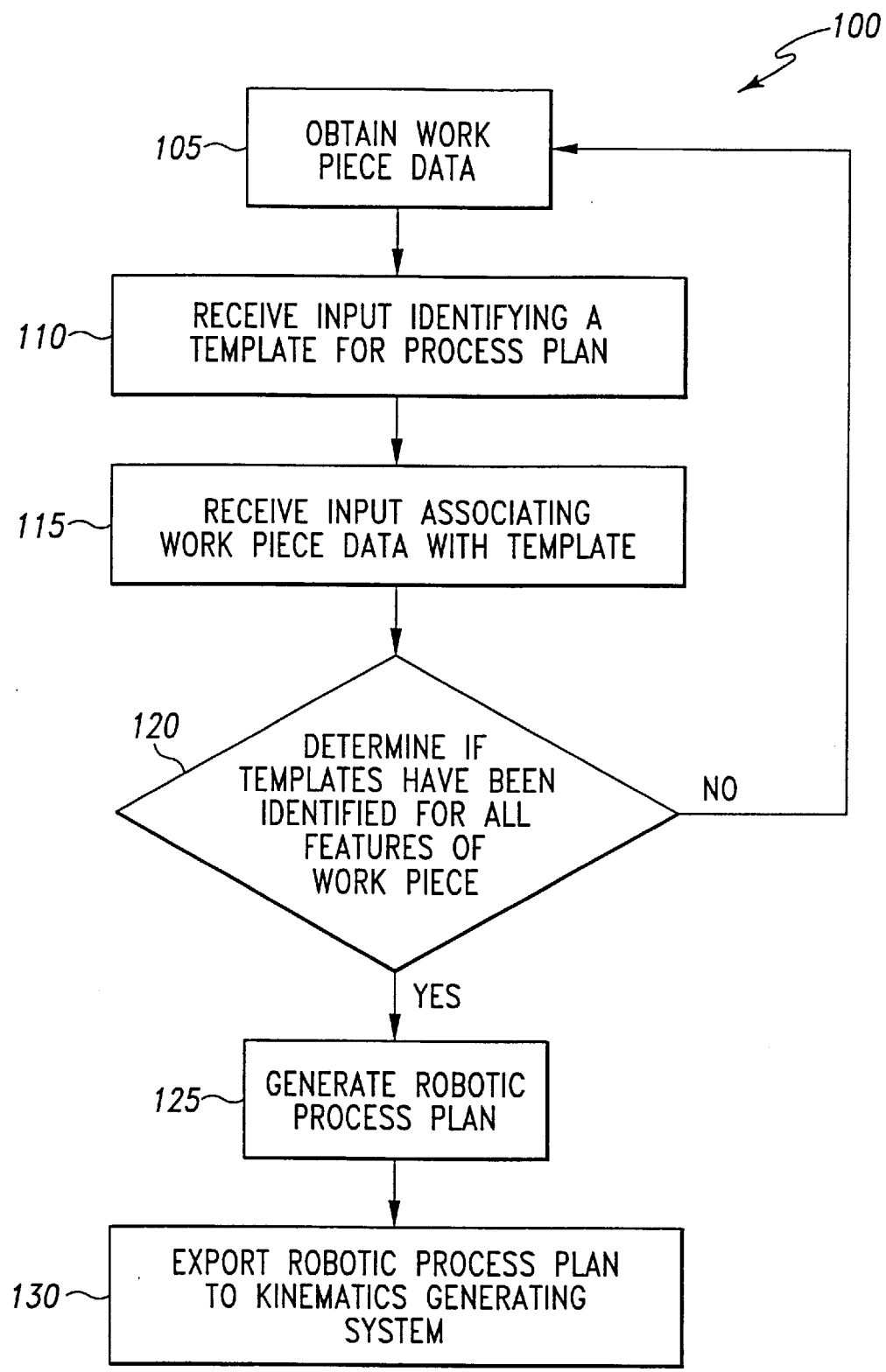
FIG. 1 shows a flow diagram of an exemplary robotic process planning method according to the present invention.

FIG. 1 shows a flow diagram of an exemplary robotic process planning method 100 according to the present invention. The method is preferably carried out at least in part by a processor-based system. By way of example, FIG.

2, discussed below, shows a processor-based based system configured to be a robotic process planning system 200 according to the present invention.

Referring to FIG. 1, the flow diagram 100 includes steps that allow for an operator to generate a robotic process plan for a work piece. A work piece is a device or set of devices on which a robotic operation will be performed. The robotic operation may be cutting, grinding, gluing, painting, deburring or welding. In the exemplary embodiment described herein, the robotic operation is welding. The robotic process plan typically includes a robotic path plan and preferably includes work process information. The robotic path plan describes the movement of a work tool attached to the robot arm and the work process information describes operational parameters of the attached work tool.

Figure 4:
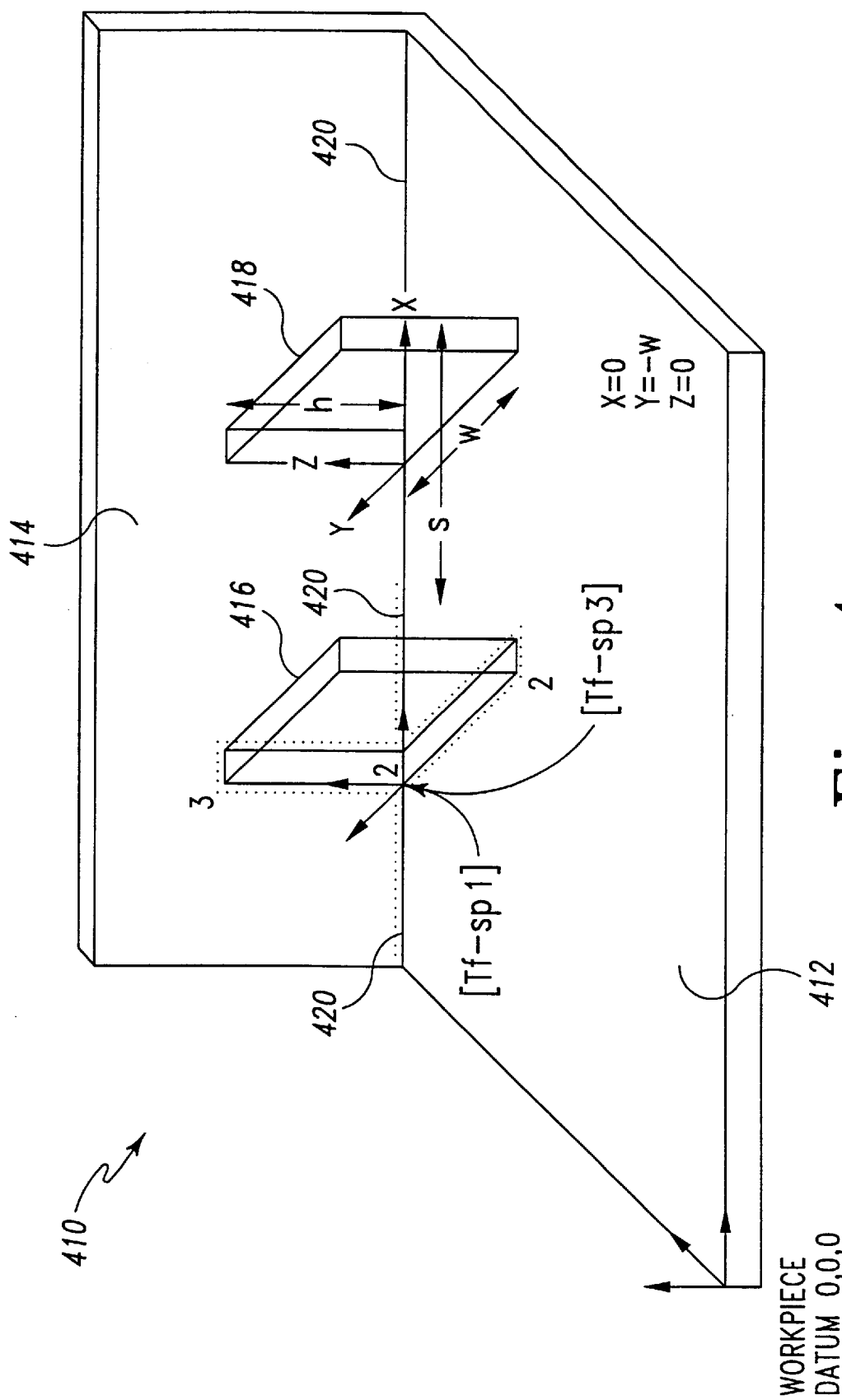
FIG. 4 shows a perspective view of an exemplary work piece and geometric process elements associated therewith.

Referring briefly to FIG. 4, a work piece 410 is shown as a four piece structure comprising a base plate 412, a back plate 414, and first and second upright plates 416 and 418, respectively. The robotic operation to be performed on the work piece 410 is a welding operation in which the base plate 412 and back plate 414 are welded together along their intersecting seam 420, and in which the first and second upright plates 416 and 418, respectively, are each welded to both the base plate 412 and the back plate 414.

Referring again to FIG. 1, in step 105, data regarding the work piece is obtained. To this end, the operator may retrieve and view work piece data from a computer-aided design ("CAD") file. In the alternative, the operator may view paper blueprints. In a fully automated system, a CAD file or the like may simply be retrieved from a memory storage device. In any event, the work piece data preferably includes sufficient dimensional and orientation information to describe the work piece and its geometric structural features.

Thereafter, in step 110, the processor used in connection with the method of the present invention receives input identifying a template that corresponds to a plurality of geometric process features of the work piece for which a robotic path plan segment has not been defined. A geometric process feature is a portion of the work operation specifically applicable to the work piece. In particular, the geometric process feature relates to the work operation as it relates to a particular geometric element or structure on the work piece, such as a two surface corner, a through-hole, or a three surface corner. The template includes a predefined template or model that describes a plurality of linked model geometric process features (referred to herein as robotic process elements). One example of a plurality of robotic process templates may be the sets that generically describe a weld that starts at one three surface corner, traverses a two surface corner, and ends at another three surface corner. As will be discussed below, a plurality of templates of differing levels of complexity may be stored in a memory storage device from which the operator may select via the processor and a suitable user interface.

As will also be discussed in more detail further below, the template includes generic path planning information and preferably includes generic work process information for the specific geometric work process represented by the template.

Examples of geometric process features may be illustrated using FIG. 4. Referring again to FIG. 4, a geometric process feature for the work piece 410 may suitably be the series of seam welds that weld the first upright plate 416 to the base plate 412 and back plate 414. In such a case, other geometric process features for the work piece 410 could include the series of seam welds that weld the second upright plate 418 to the base plate 412 and the back plate 414, and the series of seam welds that weld the base plate 412 to the back plate 414. Alternatively, a single straight line seam weld, such as the one that welds the base plate 412 to the back plate 414 between the first upright plate 416 and the second upright plate 418, may be a geometric process feature, as could a combination of all seam welds in the immediate vicinity of the first upright plate 416.

The definition of how many weld segments can be covered by a single template depends upon the number and type of available templates. If no template exists that corresponds to all of the seam welds involved in welding the first upright plate 416 to the base plate 412 and back plate 414, then several templates may be necessary to define the robotic process plan for all of the required seam welds. As will be discussed further below, however, in a preferred embodiment of the present invention, new templates may be defined which constitute combinations of existing templates. Thus, if no single template defines a process plan segment corresponding to all of the seam welds involved in welding the first upright plate 416, then the operator may, as discussed further below, define a new template that may include one or more existing templates.

Referring again to FIG. 1, assuming that input has been received identifying the template that corresponds to a plurality of geometric process features, the processor receives associated work piece data in step 115. To this end, work piece data must be associated with the identified template by an operator (or automatically by the processor) and then provided to the processor as input. In particular, specifics regarding the geometric process features, including dimension and orientation information regarding a particular operation, are associated or combined with the template to define a particular robotic process plan segment.

The associated work piece data typically includes both orientation alignment data and position alignment data. This data is used to transform the generic template "space" into specific work piece "space", which may later be used to generate the robotic process plan. In addition, the associated work piece data may further include custom-defined work process parameters, such as, in the case of welding, the separation (i.e. gap) of the parts at the weld seam and the height of the weld. Moreover, the associated work piece data may include dynamically linked control variables that are common to an entire process that includes several process plan segments. An example of a dynamically linked control variable is a weave pattern variable that is defined for an entire process, but is adjusted dynamically based on certain user-input provided in the associated work piece data.

In any event, once processor receives the associated work piece data in step 115, then the processor determines in step 120 whether a template has been identified for all of the geometric process features for the work piece. In other words, it is determined if the entire process for the work piece has been defined through steps 110 and 115. If not, then the process returns to step 110 and identifies a template corresponding to one or more of the remaining geometric process features and proceeds accordingly.

If, however, one or more templates have been identified (and appropriate work piece data associated therewith) that cover all of the geometric process features of the work piece, then the processor proceeds to step 125.

It is noted that the processor may determine whether a template has been identified for all of the geometric process features based on user input directed to that very determination. Alternatively, the processor may automatically make such a determination based on a CAD file of the work piece and the identified templates.

In any event, in step 125, the processor generates the robot process plan. The robot process plan includes a plan identifying the path and preferably pose of the robot and robot work tool in robot space. The robot process plan preferably also includes work tool operational instructions. To this end, the processor uses predefined process knowledge embedded within the templates to define robot movement and work tool operation. The processor combines the predefined process knowledge with the associated work piece data to generate the robot process plan.

For example consider a template that describes a straight line weld ending at an outer corner on one end and an inner corner at another end. The template would be preprogrammed to define the robot movement for such a weld. Such a weld may include wrapping the weld around the outer corner, moving in a straight line, and then ending at the inner corner. Such process knowledge is readily obtained from sources knowledgeable about the relevant processes. For example, the processes of performing a corner weld with a wrap, or a straight line terminating in an interior corner, or even a curved arc, are well-known to those of ordinary skill in the welding art. The process knowledge may readily be represented by the template that describes the process in generalized terms.

For example, a template may include a set of rules that define a process plan when the proper associated data is provided. One such template may be that associated with the above described line weld between an outer corner and an inner corner. Those rules are provided below in Table 1.

TABLE 1

Input attribute data: approach_point, first_corner, wrap_point, second_corner; {work piece data input by user}
Input parameter data: gap, weld_height; {work piece data or configuration data from user, may be used for several templates}
Set P1 = wrap_point; {P1 is the wrap around end point, defined by the user in this example; in other examples, it may be derived from parameter data or simply defaulted as n millimeters from the first_corner)
Set P2 = first_corner; {P2 is the position of the outer corner as defined by the user}
Set P3 = second_corner; {P3 is the position of the interior corner as defined by the user}
Set D1 = direction(P1, P2); {this is a mathematical function that defines a direction of travel between the wrap around end point and the first or outer corner; such a function would be well known to those of ordinary skill in the art}
Set D2 = direction(P2, P3); {The same mathematical function is used to define the direction of travel between the two corners}
Set D3 = direction(approach_point, P1); {The same mathematical function is used to define the direction of travel from the robot approach point to the wrap around end point}
Set X1 = distance(P2–P1); {determines the distance between P2 and P1 using a common mathematical formula that provides the distance between two points in three dimensional space, which is the square root of the sum of the squares of the differences between the x, y, and z coordinates of each point}
Set X2 = distance(P3–P2); {same formula used to determine the distance between P3 and P2}
Set X3 = distance(P1–approach_point); {same formula used to determine the distance between the approach point and the wrap around point}
Move_robot (X3, D3); {start of path assumes robot is at the approach point, this command moves the end effector or weld tool from the approach point to P1}
Begin_weld (gap, weld_height); {starts a weld operation and uses the parameters to determine welding parameters such as wire feed rate and arc current}

TABLE 1-continued

Move_robot_weld (X1, D1); {moves the weld tool from P1 to P2 using predefined movement information associated with welding, which includes a weld velocity that is determined based on the user-defined weld height, the wire feed rate, and the arc current}
Pause_movement_weld (outer_corner); {causes robot to pause at P1 for a length of time associated with a predefined structure called "outer_corner"; which effectuates a predefined technique used to provide a slightly larger weld at the corner}
Move_robot_weld (X2, D2); {moves the weld tool from P2 to P3 using the predefined movement information}
End_weld; {causes the welding operation to stop}

The set of rules of Table 1, provided in pseudocode, illustrate the concept of how a standard set of rules can be used to generate a robotic process plan for a specific implementation of a generic template. For example, virtually any weld that starts at an outside corner with a wrap-around, and ends an inside corner via a straight line path, may be defined by simply providing the appropriate work piece data to the above template rule set.

It will be appreciated that the set of rules defined above in connection with Table 1 represent a simplified version of a set of rules that would be associated with a template. The example is provided for illustration purposes only. Those of ordinary skill in the art could readily devise their own rules by which data associated with a work piece, such as position, orientation, and control data, is applied to a generic template to define a robotic process plan segment. In any event, such sets of rules are employed in step 125 to generate the robotic path plan information on the associated work piece data and the identified template or templates.

In addition, the robot process plan may include a separate path plan for use in connection with an optical or other sensor attached to the robot. In particular, robots often use sensors to identify work piece points in real space which slightly vary from programmed points. Such sensors allow the robot to adapt its process program to account for fixturing tolerances and the like. Thus, a particular robot operation may include first moving a sensor to the work area and collecting data. The template would preferably include the information necessary to carry out such sensor operations.

In any event, once the robotic path plan is generated in step 125, it is subsequently exported to a system that generates the robotic kinematic solutions in step 130. In particular, the robotic process plan generated in step 125 preferably does not define the actual movements of the constituent components of a robot arm, but instead provides overall movement (and sometimes robot configuration) information. The robot kinematic solutions derives the movements of the robotic arm actuators to generate the robotic path plan movements. Such systems are well-known. Because the robotic process plan may be exported to a system that generates kinematics, the robotic process plan may be employed in a variety of robotic arm designs.

It will be noted that the robotic process plan may be exported by transporting the file to another system running on another processor. Alternatively, the robotic process plan may simply be exported to another software module executed by the same processor that generated the robotic process plan.

Thus, the present invention allows a robotic process plan to be generated for a work piece using predefined templates with which specific work piece data is associated. In this manner, robotic process plans for robotic operations may take advantage of prior knowledge gained from similar operations. As will be discussed below, templates may be layered and combined in hierarchical formats that allow complex operations to be defined from as little as a single template.

Figure 2:
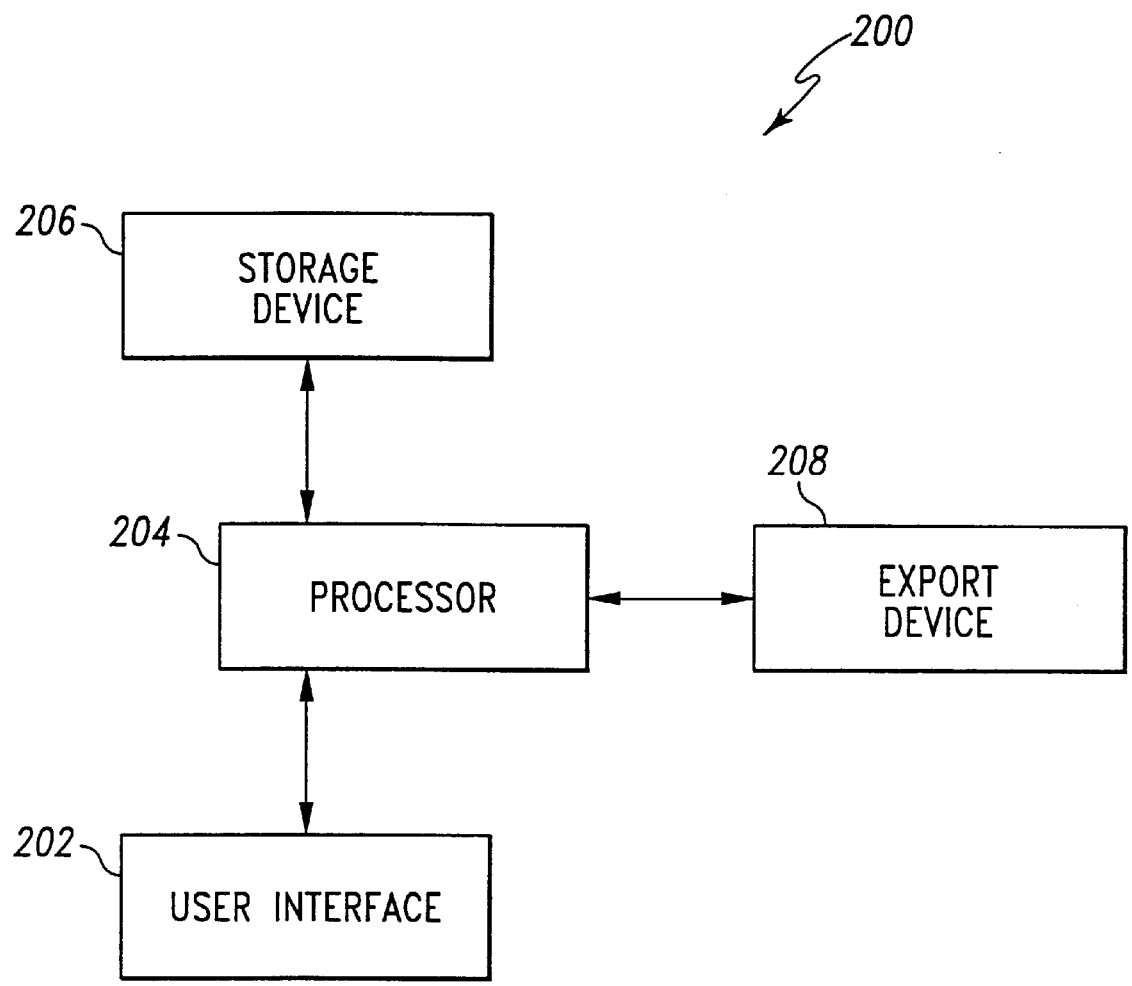
FIG. 2 shows an exemplary robotic process planning system according to the present invention.

FIG. 2 shows an exemplary system 200 for generating a robotic process plan according to the present invention. The system 200 includes a user interface 202, a processor 204, a storage device 204, and an export device 206.

The user interface 202 is a device that is operable to receive input identifying a template corresponding to a plurality of geometric features of the work structure, each geometric feature associated with one or more robotic process elements. To this end, the user interface 202 may suitably include a keyboard, a mouse or other commonly used computer input device. In addition, the user interface 202 preferably further includes a display screen for displaying information useful to a human operator in selecting an appropriate template. In a preferred embodiment, the user interface 202 also displays information regarding the work piece (including work piece data) to assist the operator in selecting an appropriate template. The user interface 202 may also receive input comprising the associated work piece data.

The processor 204 may suitably be a controller, microcontroller, microprocessor, processor or a combination of one or more of such devices that are operable generate the robotic process plan based on the associated work structure data and the robotic process elements associate with the template. To this end, the processor 204 is operably coupled to the user interface 202 to receive the input identifying the template. In a first embodiment, the processor 204 further receives the associated work piece data from the operator through the user interface 202. In another embodiment, the processor 204 obtains the associated work piece data automatically from a file stored in the storage device 206 using image processing and/or artificial intelligence techniques.

The storage device 206 comprises at least one memory storage device coupled to the processor 204. Preferably, the storage device includes a suitable combination of non-volatile memory devices and random access memory devices sufficient to support the processor functions as well as store information as identified herein. Those of ordinary skill in the art may readily select the appropriate memory devices for their particular implementation.

Figure 5:
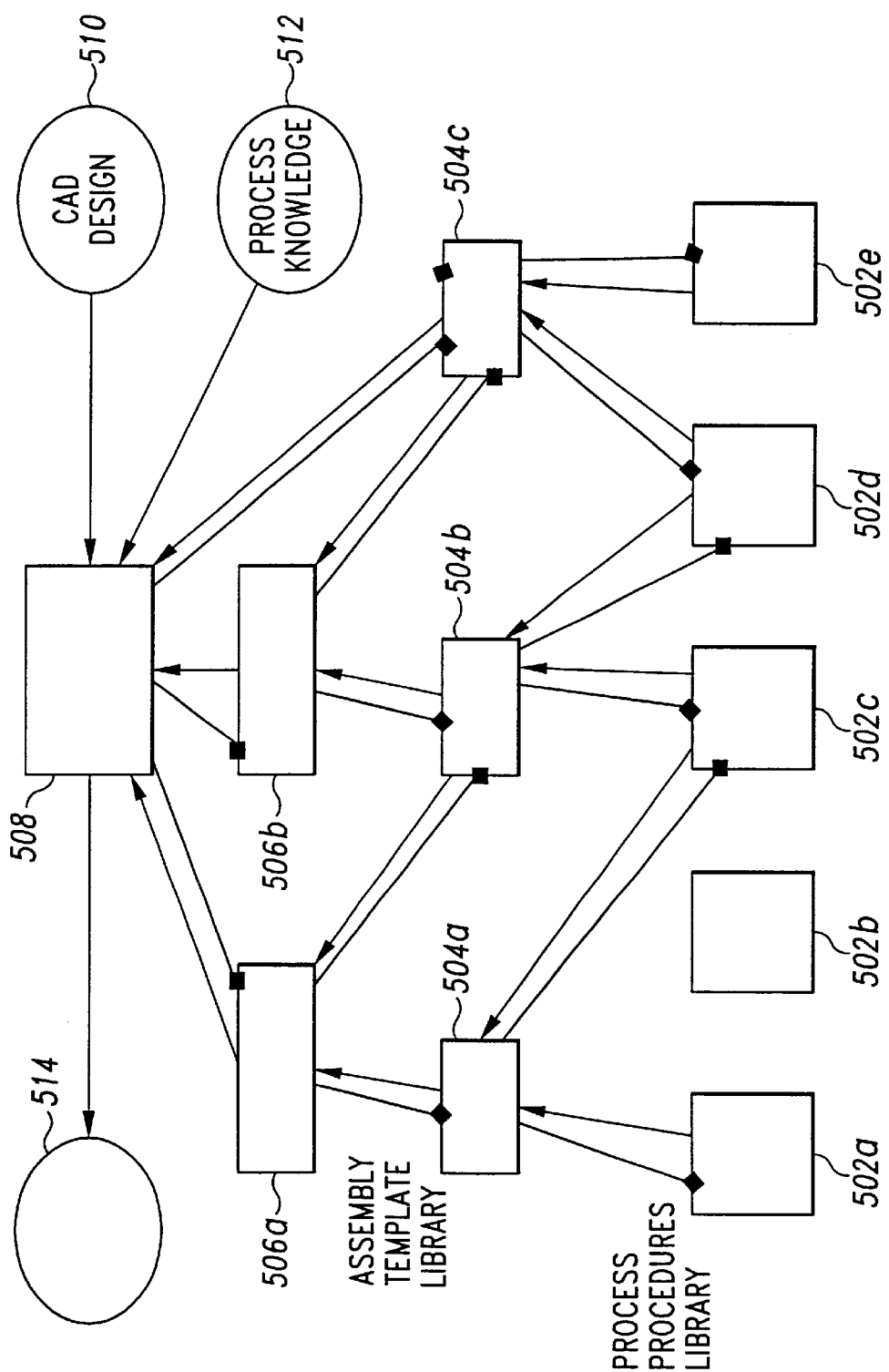
FIG. 5 shows a functional block diagram of an exemplary template library for use by a robotic process planning system according to the present invention.

The storage device 206 preferably stores a plurality of templates from which the operator may select. To this end, the storage device 206 preferably includes a template database, each template comprising one or more predefined robotic process elements. In addition, the template database further includes a set of the predefined robotic process elements from which additional templates may be defined in accordance with the method of FIG. 3. FIG. 5 described below shows an exemplary template database structure that includes a hierarchy of predefined process templates, including templates, feature templates and robotic process elements.

Referring again to FIG. 2, the export device 208 is a device that exports the generated robotic process plan to a system that generates the robotic kinematics for the generated path plan within the robotic process plan. As discussed above in connection with FIG. 1, the system that generates the robotic kinematics may include a separate processor, or may alternatively include the processor 204 executing a kinematics software module. Thus, the export device 208 may include a network connection to the kinematics generation system, a removable media device such as a disk or tape drive, or simply the processor 204 configured to pass the generated robotic process plan to another software module executed by the processor 204.

One of the features of the present invention is the ability to define new templates using fundamental process building blocks that are already available, i.e., stored in the storage device 206. To this end, the process knowledge associated with the standard geometric features is in large part resident in the fundamental building blocks, referred to herein as the robotic process elements.

To build the fundamental building blocks, process expertise (e.g. welding expertise, grinding expertise) is accessed. That process expertise preferably provides information regarding movement of a robot within a particular geometry as well as work process information regarding how to achieve a desired weld, grind, paint layer or the like. This process expertise is combined with standard mathematical functions to link user-provided work piece data to form the set of rules for the templates of the robotic process elements.

For example, Table 1, discussed above, includes both standard mathematical functions to link user-provided work piece data (functions distance(P1, P2) and direction(P1, P2)) to standard movement procedures, and work process information (the "Begin_weld" and "Pause_movement_weld" operations). The "Begin_weld" operation includes work process expertise pertaining to the selection of a particular wire feed rate and are current based on the desired weld height and identified gap. The "Pause_movement_weld" operation includes process expertise that dictates that a larger weld is required at an outside corner. Such expertise, as discussed above, is provided by one of ordinary skill in the welding art. A software artisan then translates the expertise into a set of rules such as those set forth in Table 1.

Figure 3:
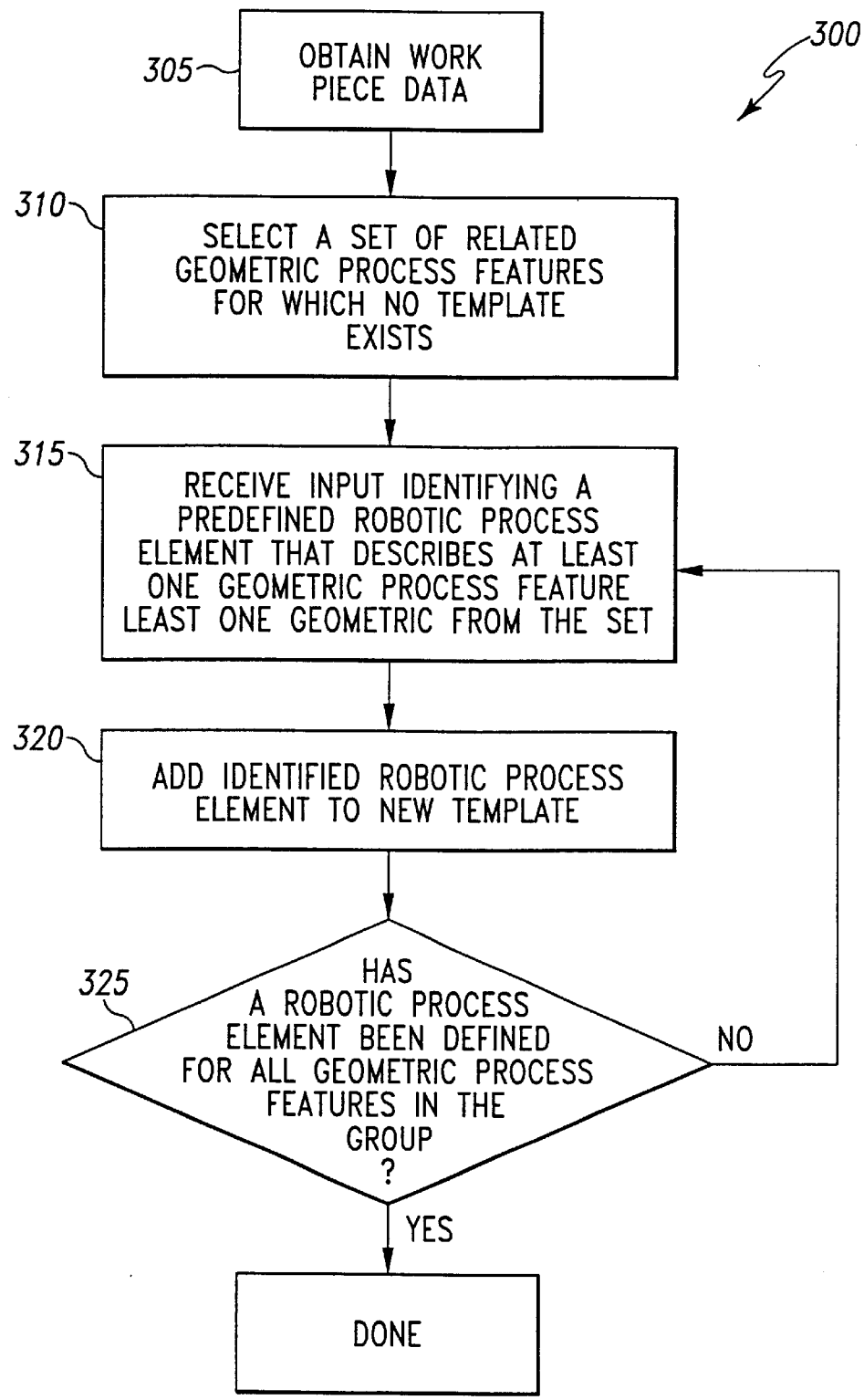
FIG. 3 shows a flow diagram of an exemplary template generation method according to the present invention.

According to the present invention, expertise found within one or more robotic process elements may be combined into a template that corresponds to a plurality of geometric process elements. FIG. 3 shows an exemplary flow diagram 300 of the method of defining a new template in accordance with the present invention. The process of FIG. 3 may suitably be carried out by the components of robotic process planning system 200 of FIG. 9. However, it will be recognized that another system that includes a user interface, processor and storage device may be used to generate new templates as described below.

Referring to FIG. 3, in step 305, work piece data relating to a work piece for which one or, more templates are to be defined is first obtained. The operator refers to the work piece data for assistance in defining the new templates. Such work piece data may suitably consist of blueprints or CAD files relating to the work piece. However, it will be recognized that a new template may be developed directly from the human memory of the operator.

In any event, in step 310, the operator selects a set of related geometric process features relating to the workpiece for which no template exists. The operator may select all of the geometric process features relating to the work piece or a subset thereof.

Then, in step 315, the operator provides to the processor input identifying a predefined robotic process element that describes or corresponds to at least one geometric process feature from the set of related features selected in step 310. To this end, as discussed above the robotic process elements are templates that are associated with a set of rules or instructions for carrying out a robot process for a relatively simple geometric feature of a work piece.

Typically, a set of robotic process elements are stored in an database within a storage device such as the storage device 206 of FIG. 2. The set of robotic process elements preferably corresponds to most, if not all, of the possible geometric process features of any work piece. In other words, sufficient robotic process elements should be defined such that various combinations of defined elements may describe virtually any work piece, similar to the manner in which the twenty-six letters of the English alphabet may be combined to form virtually any word (and sentence) in the English language.

In any event, once input identifying the robotic process element is received in step 315, the processor in step 320 adds the identified robotic process element to the new template. In particular, if the identified robotic process element is the first robotic process element of the new template, the processor forms the new template starting with the identified robotic process element. Alternatively, if the new template already includes one or more previously-added robotic process elements, then the processor adds the robotic process element identified in step 315 and provides any linking information (e.g., relative start and stop points) relating the identified robotic process element to the previously-added robotic process elements.

Moreover, during step 320, the processor may receive input from the operator defining the position of the identified robotic process element in the sequence of robotic process elements represented by the new template. In other words, the operator defines the sequence of the robotic process defined by the template. Thus, the operator may provide additional knowledge to the template by specifying not only the types of robotic process elements associated with the template, but also the sequence in which the robotic process elements are executed in the robotic process plan.

Thereafter, in step 325, the processor determines whether a robotic process element has been defined for all geometric process features in the set. To this end, the processor may receive input from the operator directly addressing that determination.

In any event, the processor, with or without additional input from the operator, determines whether the new template has been entirely defined. If not, then the operator returns to step 315 and proceeds as described above. If so, however, then the operation is complete.

The flow diagram 300 thus operates to generate templates that may be used in the flow diagram 100 of FIG. 1, described above. In time, the above flow diagram 300 may be employed to build a database of a large number of complex templates for robotic processes. As a result, defining subsequent robotic processes may be substantially simplified by the availability of a wide variety of templates. It will be appreciated that each of the templates contains accumulated knowledge of the robotic process gained from prior experiences. By exploiting such accumulated prior knowledge, robotic process planning can be greatly simplified by the present invention.

To assist in exploiting different levels of knowledge gained from past experience, the present invention preferably includes multiple hierarchical levels of templates. Specifically, in accordance with a preferred embodiment, a hierarchy of templates is defined in which one or more geometric process elements may be combined to form a feature template, and one or more feature elements and/or geometric process elements are combined to form an part template. In this manner, processes may be defined with templates of differing granularity ranging from the fundamental geometric process element to a relatively comprehensive part template.

FIG. 5 shows a block diagram showing an exemplary knowledge base 500 hierarchy and the information processing arrangement of the present invention. The knowledge base 500 comprises geometric process elements 502*a* . . . 502*e*, feature templates 504*a* . . . 504*c*, and part templates 506*a* and 506*b*. As shown in the diagram, a part template includes information from one or more feature templates, and a feature template includes information from one or more geometric process elements. For example, the part template 506*b* includes the information from the feature templates 504*b* and 504*c*. The feature template 504*b*, in turn, includes information from the geometric process elements 502*c* and 502*d*. Likewise, the feature template 504*c* includes information from the geometric process elements 502*d* and 502*e*.

The information processing arrangement includes the process planning system and/or method 508 which may suitably be the system 200 of FIG. 2 or the process illustrated in FIG. 1. The process planning system/method 508 relies on work file data 510, the process knowledge or expertise 512 of the operator, and the knowledge base 500 to generate the robotic process plan. The interrelationship of the process planning system/method 508, work file data 510 and process knowledge 512 of the operator is described further above in connection with FIGS. 1 and 2. In the exemplary diagram shown in FIG. 5, the process planning system/method 508 has defined a robotic process that employs the part templates 506*a* and 506*b* and the feature template 504*c*.

It will further be appreciated that new feature templates may be generated using any combination of geometric process elements 502*a* . . . 502*e* using a method based on the flow diagram 300 of FIG. 3. Moreover, new part templates may be generated using any combination of feature templates 504*a* . . . 504*c* using a similar method based on the flow diagram 300 of FIG. 3.

FIG. 6–19 and the accompanying description herebelow describe a specific embodiment of the present invention referred to by the name A-ROPPS (Automated-Robotic Path Planning System). This product will start out with a core level of operation that provides a means to generate complete robot path plans by association of part geometry to process procedural knowledge. The core system will be developed such that levels of automation can be added to fully automate the association and planning process. The system will utilize an on-line manufacturing parser that can be operated in two modes; on-line interactive or file driven. Operation requires the existence of a 3-D geometry file that represents the assembly to be robotically processed. Initially the geometry file can be imported in STEP format. A post processor will be developed which imports object oriented description files and processes them into 3-D geometry, as in the case of the NFF for ship structures. In the on-line interactive mode an operator interactively selects each weld seam (or other tooling process) and associates to a procedure template along with key attribute points that fit the template to the actual workpiece. ROPPS uses this data in conjunction with resident knowledge bases to automatically generate robotic path and process plans, including sensor operation. The file driven method provides a means to select seams and associate attributes in the form of a script file that can then be processed by A-ROPPS in a similar manor to the on-line approach. The on-line approach will be developed and integrated first. The file drive method provides a means to allow the manufacturing plan to be imported directly thus eliminating the manual interaction.

Definition of Terms

The A-ROPPS system shall use the following naming convention:

Workcell—The collection of robotic and part positioning devices in a specific relationship (configuration) which will be used to process a specified part or assembly;

Workpiece—The part or assembly that is loaded into the selected robotic workcell;

Point—A 3-D point in space (3 DOF);

Pose—A point in space with an associated orientation. (6 DOF) with motion attributes (format that provides enough information that it can be executed by a robot);

Path—A collection of sequential poses;

Path plan—A collection of robotic poses with associated motion attributes and command functions;

Command—A controller function that is executed upon arriving at a programmed pose;

Trajectory—A collection of sequential points;

Attribute Point—A Point with associated coordinate frame on the workpiece that governs operation in a geometric sense;

Attribute—A component of data that governs operation;

Motion attributes—A set of data that pertains to the motion characteristics of the robot or positioning device;

Job—A collection of path plans;

Robot program—A collection of jobs that are executed in a defined sequence by the robot;

Curve segment—A collection of 3 points that describe an are in a plane. The set consists of a curve start point, and curve center point and a curve termination point;

Triad—A symbol that represents a coordinate system that associates a local datum (coordinate system) at a selected point; typically it is used to establish the coordinate system for an attribute point; when using the Triad to select a coordinate frame the X-axis must point in the process travel direction;

Process knowledge—The set of process variables that govern use of the consumables; this information is stored in process schedules (weld schedules grinding schedules, etc.);

Weld process knowledge—Process knowledge schedule specific to welding consistion of 3 sections, 1- Set-up variables (defines the consumable and process equipment),
2- Process definition (defines the weld and its environment),
3- Process variables (defines the associated process boundary conditions);

Process procedures—This is the information that pertains to process delivery (path plan) as a function of geometry. This data is contained in the Smart Element library;

Smart Element—The collection of process procedure data with respect to geometric entities;

Smart Feature—A template which generically describes how a series of smart elements are linked together to form a complete weld. Key attribute points govern the weld placement; and Smart Part—A template which generically describes how a series of smart features are linked together to form a series welds. Key parametric dimensions and attribute points govern the weld placement.

Knowledge Base Hierarchy

The A-ROPPS system utilizes process knowledge in two forms, procedures and parameters. The parameter section can be under separate document. The procedure section consists of a three-layered knowledge base approach. This approach utilizes Smart Parts, which are a collection of Smart Features, which are a collection of Smart Elements. Each Smart Element provides a set of process procedures (collection of process points) for a basic geometric entity. Each procedure is in the format of a path plan referenced to the local datum for that entity. Thus a Smart Element provides the path plan for processing a specific element of geometry, such as a three surface corner. Elements include process and sensing strategies for various phases of the process plan including; process start-up, steady state operation and process termination. A Smart Feature is a collection of Smart Elements that combine to form a single weld path, weld-on to weld off plan. The Smart feature is in the form of a template that links a collection of elements in a geometric sense. That is mathematically, how the elements relate to each other. The feature then fits the series to an actual workpiece based on key attribute points. The Smart Part is a collection of features, which treads a series of features together to form a sensing strategy and process path plan for complex shapes. It also uses a template, which relate a series of features together in a mathematical or parametric approach. It uses a combination of attribute point and key dimensions to fit the Smart Part path plan to a workpiece.

Figure 6:
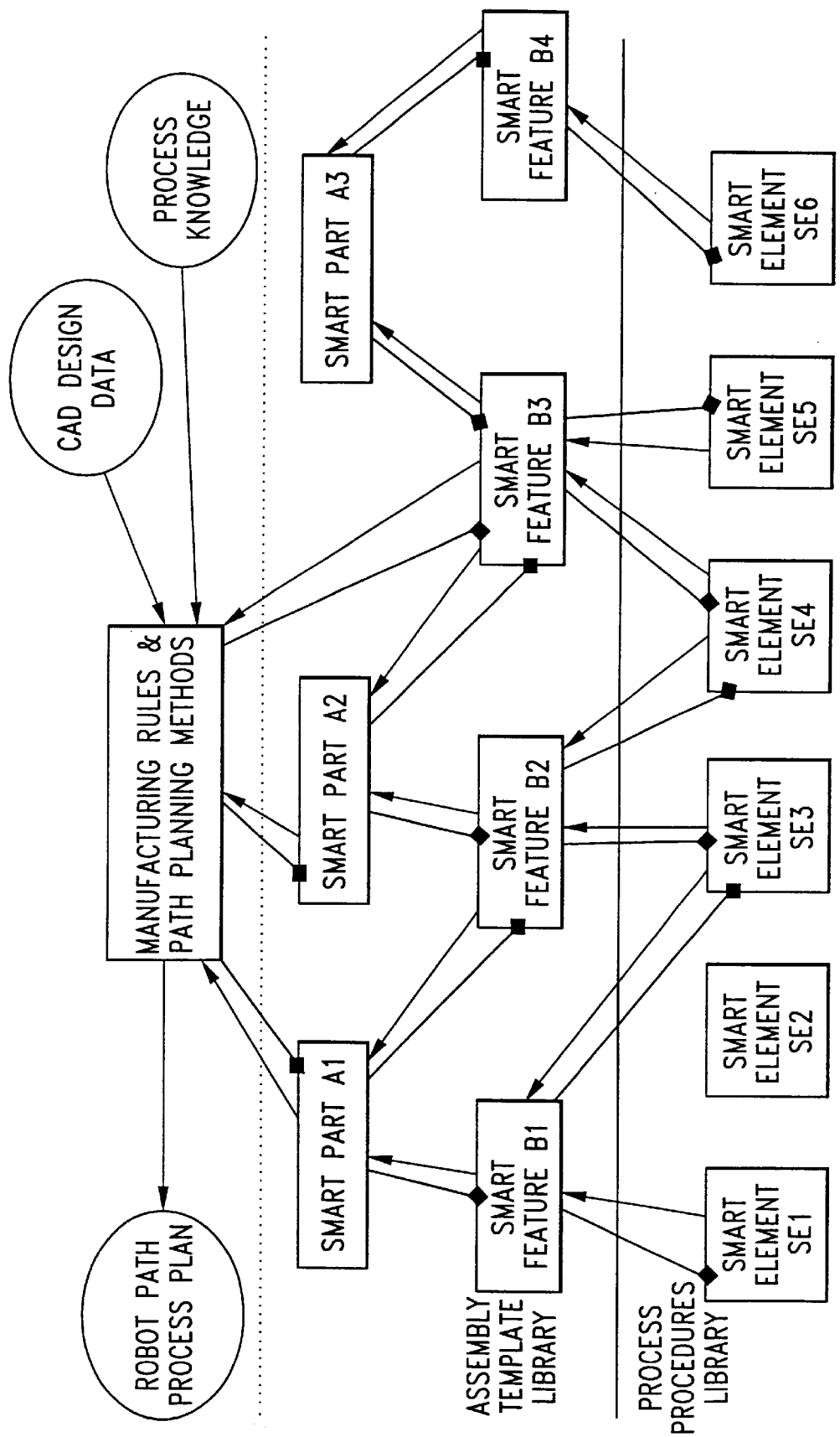

FIG. 6 shows a diagram of the knowledge base hierarchy.

Smart Element

As smart element consists of a local path plan for a given geometric feature. The element is programmed as a collection of process points, required to navigate that geometric feature. There are three classifications of elements, start, travel, and termination. As a minimum a process requires a start state element and a termination state element. It could also have a number of middle type transitions in between called travel elements. These are used to navigate through changes in travel direction or process. For example navigating through an interior corner or about a curve. An element contains a process path plan that is parametrically attached to its own local coordinate system and a number of external control variables. It is a function of several defining attributes that govern the trajectory of the path plan. A smart element contains the following information: Defining attributes, control variables and process procedure data.

Defining attributes include the data set that defines the geometric use of this element. Control variables, are variables that dynamically modify path data for a specific instance of feature. Typically these attributes specify information in regard to wrap distances or geometric features such as snip size. This data effects the path plan at the local geometric level. Process procedure data comprises a set of path data which defines the process or sensing tool trajectory in terms of a local coordinate system.

Smart Feature

A smart feature is a collection of smart elements that are combined to form a single executable weld path in tool vector space. The smart feature has a unique user assigned name and contains attributes, which govern its operation. The smart feature takes on the coordinate system of the first (start) element. All elements are then linked in a sequential manner with associated transforms that relate each sequential element back to the start element. The smart feature incorporates data that can dynamically pass control variables to the smart elements that dynamically adjust the element's local path plan. Because elements and features are database resident, they can be modified in regard to the use of control attribute data for specific user needs. Thus the smart feature is flexible in its configuration in regard to data received and data sent on to the elements. The smart feature must also specify and sequence (assemble) the sensor elements that correspond to the associated tooling elements.

The smart feature takes on the form of a template. It provides data in regard to its use and how elements are linked together in an orientation sense. In this sense it uses a basic geometric model which specifies the how the elements align to each other from an orientation sense. Orientations of the elements are aligned to the first, or start, element in the series. A flag must also be provided which determines the direction of the weld process with respect to the element coordinate system. This effects the direction of the work angle.

The feature is equipped with certain dynamic storage elements that provide a means to pass control variables to the element prior to final positional processing. These allow for path modification at the element level. For example a weld start element may have a corner wrap in which the portion of the path that performs the wrap is parametrically attached to the wrap distance. Thus, the feature can pass it such that that start element may be used over a wide range of occurrences with different wrap distances.

The geometric model (template) is fitted to the actual workpiece through a set of input data. This includes a transform that aligns the features orientation (start element) to the workpiece. It also includes a series of attribute points that establish the position of each element within the workpiece. Attribute point can be provided as direct input from the parsing operation or passed from an expression in a smart part template. Note certain elements require more that one point. For example a curve element requires three points to establish its position. Input data can also include a variety of control variable data. For example the wrap distance that is sent to the element can be set within the feature template or can be passed in as input, and be passed along to the element. This method of fitting allows a basic feature to be fitted to a wide range of different sized shapes.

Summary of inputs:

| | |
|---|---|
| [Tf-w] | Transforms feature to workpiece space |
| [AP1 . . . n] | Attribute points |
| CV1 . . . n | Control variables as specified |

The following data format has been established for the Smart Feature template:

TABLE 2

Defining attributes:

| | |
|---|---|
| Name: | user assigned name |
| Revision: | assigned revision number |
| Process: | |
| Type: | tooling operation type (welding, grinding, etc.) |
| Designation: | TBD |
| Position: | optional position this feature is qualified for (1f, 2f, etc.) |
| Process spec: | optional process spec (weld spec, edge chamfer size, etc.) |
| Adaptive: | yes/no, TDB |
| N | number of linked elements |

TABLE 2-continued

Element Link List

Element # 1 (Start element)

Element identification name
Local rotation (unity for start element)    // [T1]
Control variables (snipe, distance, direction, etc).
Process attributes (schedule #, etc.), optional - TBD at a later date
Element # 2 (first steady state, if required)

Element identification name
Local rotation (second element)    // [T2]
Direction flag (+/−)
Control variables (snipe, distance, direction, etc).
Process attributes (schedule #, etc.), optional - TBD at a later date
Element # 3 (next steady state, if required)

Element identification name
Local rotation (next element)    // [T3]
Direction flag (+/−)
Control variables (snipe, distance, direction, etc).
Process attributes (schedule #, etc.), optional - TBD at a later date
Element # N (termination state)

Element identification name
Local rotation (termination element)    // [T4]
Direction flag (+/−)
Control variables (snipe, distance, direction, etc).
Process attributes (schedule #, etc.), optional - TBD at a later date The control variables are dynamically linked data elements.

Note regarding optional attributes. If these fields are blank, then the system shall default back to a system level configuration value. For example a system level default weld specification might be a 5/16" fillet. If the weld spec is blank the system will proceed to process this feature as if it were to weld a 5/16" fillet.

Figure 7:
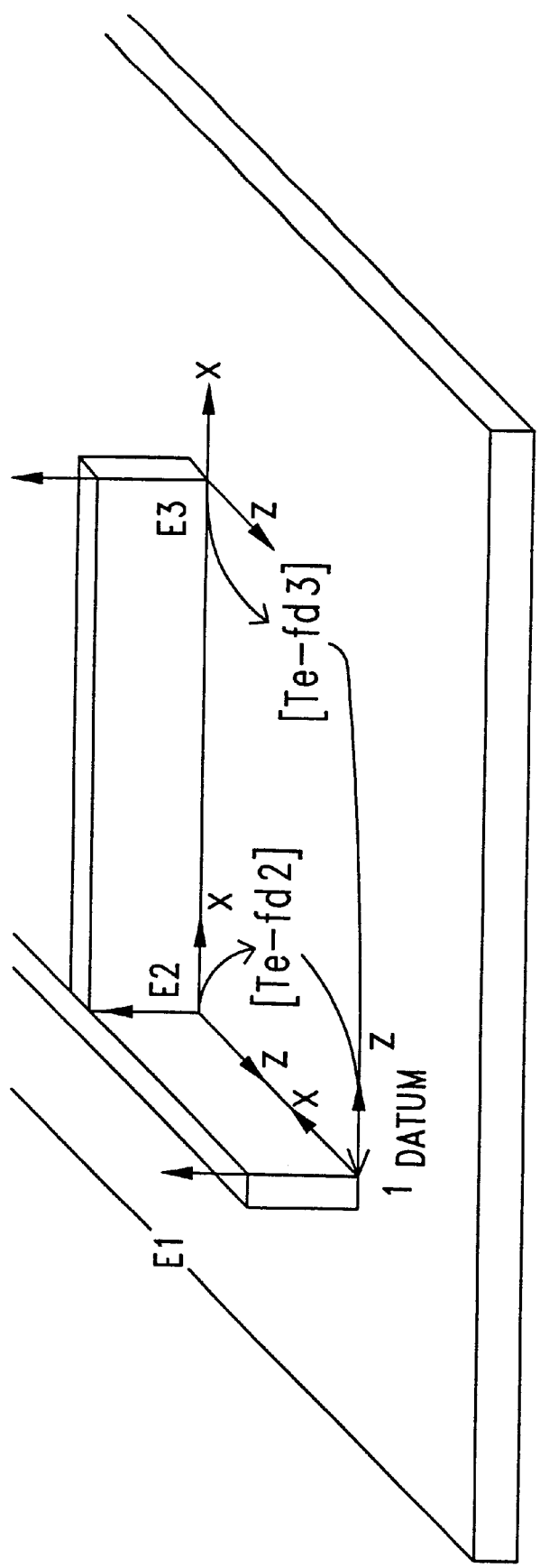
Figure 8:
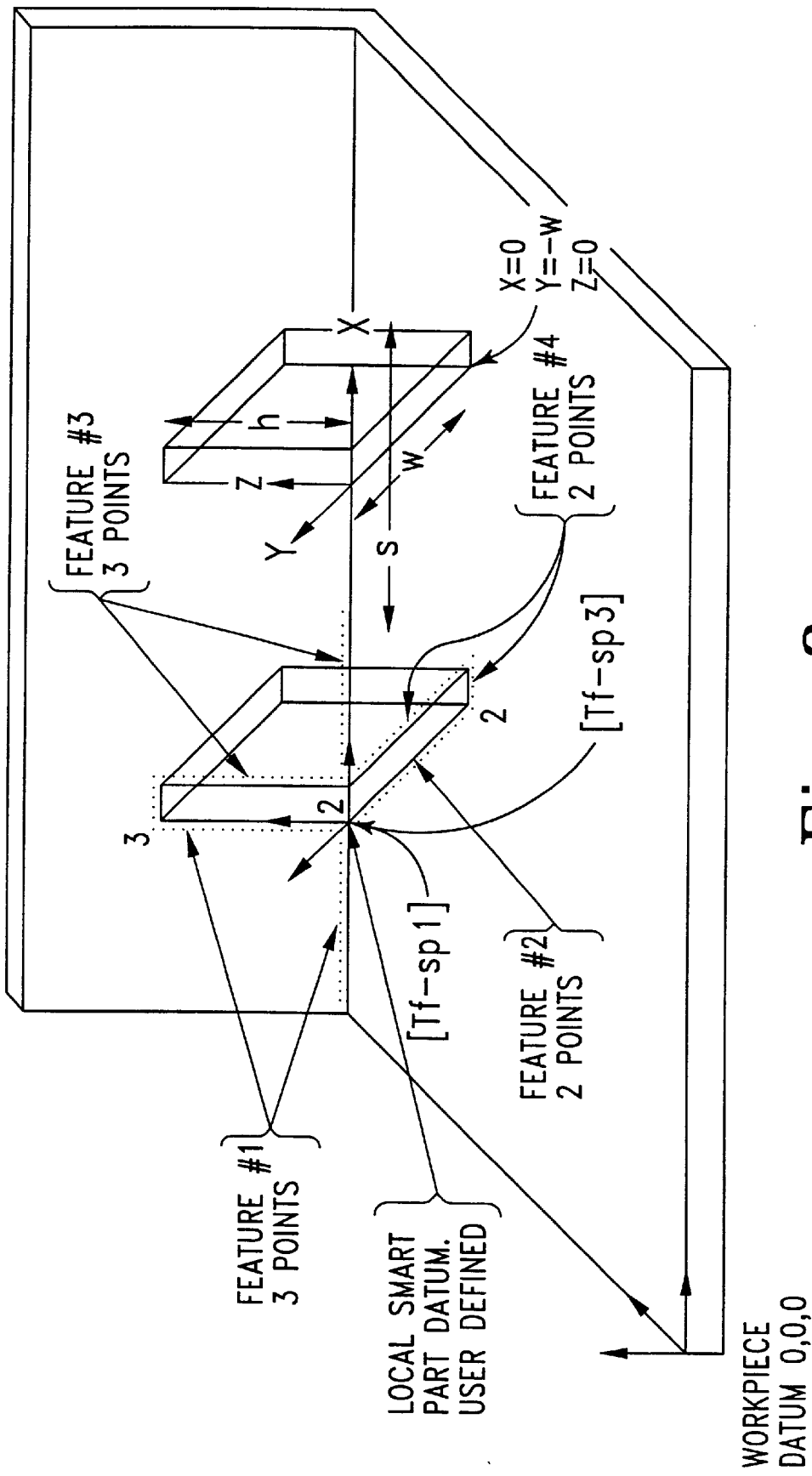

Table 3 and FIG. 7 together provide an example that illustrates a smart feature that links three elements to form a horizontal weld through an interior corner.

TABLE 3

| | |
|---|---|
| Name: | Horizontal corner weld |
| Revision: | A, 7-1-98 |
| Process: | |
| Type: | Weld |
| Designation: | E71-t1 |
| Position: | 2F (horizontal fillet) |
| Process spec: | Fillet, 7, 7 |
| Process sch: | |
| Adaptive: | yes |
| N: | 3 |
| Element 1 | |
| W2SC-S-Wrap-A | 2 surface corner - start w/wrap, rev A |
| 0, 0, 0 | (unity alignment) |
| 0, 5, + | (control variables [s = 0, wrap = 5 mm, + direction]) |
| process = | tbd |
| Element 2 | |
| WINC-L-A | interior corner-left handed, rev A |
| 0, −90, 0 | (−90 deg rotation about Y) |
| | no control variables defined |
| process = | tbd |
| Element 3 | |
| W2SC-T-Wrap-B | 2 surface corner-termination w/wrap, rev B |
| 0, 0, 0 | (unity alignment) |
| 0, 10, + | (control variables [s = 0, wrap = 10 mm, + direction]) |
| process = | tbd |

Smart Part

The smart part is a collection of smart features (weld path plans) that are combined to weld a part or a repetitive section of a part. It is typically used to weld a series of joints that exhibit parametric behavior. For example a panel line collar may consist of a number of smart features which share a common datum (intersection of transverse and longitudinal stiffeners). The features are linked in the manner (sequence) in which they are to be welded. The first release of this package will not provide optimization of offset and measurement buffers. Each feature assembles all the sensing elements followed by the process elements. From efficiency stand point the collection of features should group together all the sensing jobs followed by all the process jobs. Assembling the path plans in the proper order is somewhat straightforward. Removing redundant scan (sensing) operations and renumbering the buffer associations automatically becomes a requirement.

A smart part may uses a template to establish the series in which features are to be executed. The smart part template also provides a means to place a pre-programmed path plan based on local datum. This method is typically used when complex processes must be delivered that are not suited to be developed as a series of features and elements. A typical example would be a complex shaped plug weld. This will be discussed under separate cover.

The smart part takes on the form of a template. It provides data in regard to its use and how features are linked together in an orientation sense. In this sense it uses a basic geometric model which specifies the how the features align to each other from an orientation sense. Orientations of the features are aligned to a local datum established for that part.

The smart part is equipped with certain dynamic storage elements that provide a means to pass control variables to the features prior to final positional processing. These allow for path modification all the way down to the element level. For example a weld start element may have a corner wrap in which the portion of the path that performs the wrap is parametrically attached to the wrap distance. Thus the part can pass it to the feature which can pass it to the element. This allows a smart part to be used over a wide range of parametric instances.

The geometric model (template) is fitted to the actual workpiece through a set of input data. Typically this includes a transform that aligns the smart part to the workpiece. It also includes a single attribute point that establishes the position of the smart part on the workpiece. It then uses a series of dimensions that fit the features to the actual workpiece. Input data can also include a variety of control variable data. For example the wrap distance that is sent to the element can be set within the feature template or can be passed in as input, and be passed along to the element. This method of fitting allows a basic feature to be fitted to a wide range of different sized shapes.

Summary of Inputs

| | |
|---|---|
| [Tp-w] | Transforms smart part to workpiece space; and |
| [APd] | Attribute datum point (location of smart path datum in workpiece space) |
| | Parametric dimensions and Control variables as specified. |

The following general format in Table 4 has been established for the Smart Part:

TABLE 4

Defining attributes:

| | |
|---|---|
| Name: | user assigned name |
| Revision: | assigned revision number |
| Process: | |
| Type: | tooling operation type (welding, grinding, etc.) |
| Designation: | TBD |
| Position: | optional position this feature is qualified for (1f, 2f, etc.) |
| Process spec: | optional process spec (weld spec, edge chamfer size, etc.) |
| Adaptive: | yes/no, TDB |
| N: | number of linked features |
| Feature Link List | |

Feature # 1

Feature identification name
Local rotation (feature to local smart part datum)
Position of feature attribute points as a function of parametric dimensions.(note 1)
Control variables (snipe, distance, direction, etc.)
Process attributes (schedule #, etc.), optional - TBD at a later date
Feature #2

Feature identification name
Local rotation (feature to local smart part datum)
Position of feature attribute points as a function of parametric dimensions.
Control variables (snipe, distance, direction, etc.)
Process attributes (schedule #, etc.), optional - TBD at a later date
Feature # 3 & 4 handled in a similar manner Notes:
1   The number of attribute points is the sum of all the element attribute points. Remember that some elements require more than one attribute point.
2   Feature attribute points are in mathematical expression format FIG. 8 in combination with Table 5 provides an example of a Smart Part

TABLE 5

Inputs:

| | |
|---|---|
| [Tp-w] | Orientation alignment data (smart part to workpiece coordinate system) |
| [APn] | Position alignment data (Smart part datum to desired work piece location) |
| s, h, w | Parametric dimensions (separation, height, width) |
| d, s, Dir | Control variables |

Note: Parametric dimensions are custom generated (defined) according to requirements.
Template example:

Defining attributes:

| | |
|---|---|
| Name: | gusset weld |
| Revision: | 1-A |
| Process: | |
| Type: | welding |
| Designation: | TBD |
| Position: | 2f |
| Process spec: | |
| Adaptive: | yes |
| N: | 4 |

Feature # 1:

Transverse wall
0, 0, 0   // rotation angles to align feature to local smart part datum
// Position of feature attribute points (expression format):
Point 1: -s/2, 0, 0
Point 2: 0, 0, 0
Point 3: 0, 0, h
Control variables (type, snipe, distance, etc)
Process attributes (schedule #, etc.), optional - TBD at a later date TABLE 5-continued Feature 2:

Stiffener to deck
0, 0, 0   // rotation angles to align feature to local smart part datum
// Position of feature attribute points:
Point 1: 0, 0, 0
Point 2: 0, −w, 0
Control variables (type, snipe, distance, etc)
Process attributes (schedule #, etc.), optional - TBD at a later date
Other Features: Etc. etc.

Utility Functions

Create Smart Feature

This function provides the operator with tools to generate a smart feature. The operator starts by generating a representative geometric model in solid works. A database template is then used to perform all links necessary between geometry and its interface with the input data and element list. The template, being a database entity, uses the standard database utilities for data entry, printing and editing.

Create Smart Part

This function provides the operator with tools to generate a smart part. The operator starts by generating a representative geometric model in solid works. A database template is then used to perform all links necessary between geometry and its interface with the input data and feature list. The template, being a database entity, uses the standard database utilities for data entry, printing and editing.

Simulation Based Programming Functions

This section describes a minimum set of interactive functions that are required for the simulation and off-line programming sub-system. This sub-system provides a set of functions essential to off-line path teaching, path simulation and verification and modification. These functions shall be developed as an application layer on Solid Works. The simulation and programming functions along with the other A-ROPPS functions shall work concurrent and in conjunction with Solid Works.

Tool Select—Sets the TCP of the robot path based on a selection of a tool from the pre-defined tool library. The tooling library must contain both the geometry and its corresponding TCP that is activated once installed on the robot.

Motion type—This function establishes the type of motion between a series of points. Choices include linear, Cartesian or joint.

Mark—The mark function provides a means to select a point (tool vector or robot path plan) that is currently displayed on the assembly. The selected point can then be modified using any of the simulation bases teach tools. It the displayed path were a robot path then the robot, with process tool, will be displayed. If the path were a Copy—The copy function provides a means to re-position a marked point into a new designation by pointing to that designation with the system cursor. Typically the marked point is being copied to a geometric feature such as an interior or exterior corner.

Delete Point—The delete function provides a means to delete a programmed point (marked) from the path list.

Delete path—This function provides a means to select and delete a programmed path.

Show path—The show path provides a means to display a programmed path in either tool vector space or robot space. This function provides a simulation tool that can be used to visually display a path overlaid with the assembly.

(Create) Find path (if it exists!)—This function established a mode of operation in which a new path plan can be created through visualization and pendant based functions. Under this mode only a robot path can be created. Consecutive selection of this function will toggle, create path mode, on and off. Under this mode of operation several functions for jogging the robot into position shall be used. These functions move the robot TCP in joint or Cartesian mode, see following sections. This function relies on the record point function to memorize a point and transfer it to a path program file.

Rubber Stamp—This function provides a means to select a path and rubber stamping it into a different location as determined by motion of the external positioning axes. The new position can be obtained by jogging the external axes or by operator specified offsets to the initial position of the original path.

Robot Motion Functions

Mode—This function selects between Cartesian motion or joint motion.

Jog robot—This function, enables robot motion (selected TCP) through pendant simulation.

Move point—This function allows the operator to move a point by a specified offset from its current pose. The point must first be marked.

Jog ext—This function provides a means to jog an external robot positioning axis device. These axes are associated with the workcell and can be either servo coordinated or index, as specified in the workcell configuration file.

Attach pose—This function provides a means to select a pose, on the assembly, and automatically align and attach the current robot TCP to it. This is a solution but not an optimized solution in regard to the robot joint configuration. The Jog loose function can then be used to resolve redundant axes.

Jog Pose—This function provides a means to jog the robot configuration about the current robot pose (position and orientation). This provides a useful tool for resolving redundant axes based on holding a fixed tool pose.

Record—This function records the current TCP pose and configuration data as a point in the path plan list. Once a path has been built the system must provide a means to associate motion attribute and command data.

Trace—This function set the robot in motion along the current tool path. It can be run at true speed (100%) or at specified speed scale factor. This function allows for continuous play (cont.), stepping forward one point at a time (next) or stepping backward one point at a time (previous).

Insert—This function provides a means to create and insert a new point just after the currently marked point.

Attributes—This function provides a means for the operator to set or modify the motion attributes for a marked point.

Automatic mode, On-line Operation W/manual Seam Parser

This section describes the step by step procedures used to process an assembly using manufacturing data, design data in conjunction with Solid Works processing and smart part and feature association. This allows an operator to dynamically build a robotic path and process plan (program) interactively, on-line, through the A-ROPPS/Solid Works system. Under this method no interactive robot programming is required. Programs are automatically built by selecting seams (process paths) on the workpiece solid model and associations with the system knowledge bases.

Work-cell Selection

On-line processing of a robotic path and process plan starts with the identification of a work cell in which the workpiece will be robotically processed. The operator selects this workcell from a library. A workcell consists of a specific type and size robot, associated robot transport mechanisms (Track, Gantry, etc.), part positioners (static holders or active positioning), end of arm process tooling and any fixtures that will hold the part within the positioner. Workcells are stored in a central library and are catalogued by name.

A selected workcell includes a reasonable facsimile of the various structures along with the associated mathematics (kinematics) that govern their operation. The workcell configuration must match the actual manufacturing workcell to the limits of the associated sensing and other registration strategies. The structural elements of the workcell components shall be kept to simple approximations so as to minimize effects on system timing.

Building of new workcell components and workcell configurations requires development of both component geometry and association of the proper control mathematics. The geometry portion of this operation is accomplished using standard solid works functions. Further information on developing new workcells can be found in the utility function section of this document.

Load Workpiece

Once the workcell has been selected the operator must load the geometry of the workpiece. For the initial release this shall be accomplished by importing the workpiece geometry, using STEP format. In this case STEP is limited to the workpiece geometry, i.e. not any of the specific API's. Once the assembly has been loaded it must be married to the workcell. This requires 6-DOF manipulation of the part to the workcell fixture. Once in place, the geometry of the assembly and workcell will be merged and saved in a composite workcell file in Solid Works format.

Alternate ways for importing geometry, using, an object-orientated and product modeling approaches, will be a future requirement. Future plans will develop these means to import product geometry, assembly, and manufacturing data using Neutral Format Interface Script Files (NFISF) and or direct decode of STEP API-218.

Workpiece Seam Parsing

Workpiece seam parsing consists of an interactive means to identify and select seams (or other tooling process paths) through visual manipulation of the workpiece and selection of key boundary attributes. The selection process requires that a scam (smart feature) or seams (smart part) be identified along with any attributes that govern the location and boundary conditions associated with that entity. The selection process is performed using standard Solid Works functions and the results are passed to the A-ROPPS processing using the Solid Works standard API. Key points, edges and surfaces are selected and processed to form the required attribute points and workpiece alignment data that governs how the feature or part is fitted to the actual workpiece. At this stage the association to the workpiece is in terms of tool vector paths, not robot paths. Additional attribute data in the form of parametric dimensions and/or control variables must also be extracted. The specific requirements for attribute data are a direct function of the smart part of smart feature that is being fitted. Thus, an association to the desired smart part or feature must be manually performed at the start of each parsing operation. This is accomplished using a visual browser. Once a selection is made, data from the part or element must be used to guide the operator in selecting attribute data from the actual workpiece. Although point and click is preferred, all queries shall allow for direct type in of attribute data. For example selecting the intersection of 3 surfaces to extract a feature start point will also provide a means to directly type in the x,y,z coordinate for that attribute point.

In developing the strategy for how at tribute data in handled and processed, we must keep in mind that ultimately we want to replace the manual data selection with direct data input from the design database. Thus data gathered during this selection process should be extracted and stored in a fashion that would emulate the processing being drive from a script file.

Feature and Part Association

The operator starts by selecting the desired smart part or smart feature association for the seam, or set of seams, that is about to be selected (parsed). The selection process is accomplished by selecting a suitable part or feature entry from an associated library.

A tool bar approach shall be used to first select process followed by type (part or feature). This will result in a list of possible entity names that are present in the library. The operator then selects the desired entity based on name. Once selected a simple stick figure shall be displayed along with a copy of the template data. Once confirmed the operator may continue using the selected entity or browse for another selection. After selection has been made the operator must select the associated seam on the workpiece. This shall be via a point and click on a seam that represents the primary seam or feature in the case of a smart part.

Attribute Point Selection

The data in the feature or part will then provide guidance in regard to what boundary or key guidance points will be required to fit the model to actual part space. For example, a smart feature selection will provide instructions to generate a triad at the feature start point of smart part datum. This defines the orientation aspects for fitting the model to the workpiece. Instructions are then provided to select attribute points that are required for the fitting operation. In the case of Smart features, attribute points must be selected which correspond to the element requirements. In the case of a smart part, a key datum point (rubber stamp position) along with any parametric dimensions must be selected. The system must provide a means to directly enter all or selected parameters via keyboard entry. Certain elements will require control variable data. For example a 3 surface corner starting with a snipe may query to change the default snipe dimension. Or a material thickness may be required to control the amount of wrap. Typically this type data will be entered via selection of system defaults parameters or by direct keyboard entry.

The system will provide assistance in guiding the operator as to what data is required and how to obtain it. In many instances points may be obtained directly from Solid Works functions. In other instances geometric entities will be selected and then processed into the desired attribute point. The road map for selection of points is contained within the knowledge base of the smart feature or smart part.

Fitting Operation

Once a feature has been selected and key attributes identified, A-ROPPS proceeds to fit the part/feature model to the actual workpiece. This processing will form a tool vector path directly on the selected entity of the workpiece. Note the fitting operation must generate two paths, the tool vector path, and a sensor path plan.

The result of the fitting operation is a series of tool vector points. This is in the form of a point and orientation. This data will be used for two purposes. The first feeds the simulation system in which a series of short (vectors) line segments are generated at each at each programmed point to visually illustrate tool path position and orientation as superimposed on the actual workpiece. The visual simulation tools provides a means to play forward and backward through the path as well as make modifications to any points position or orientation. The second feeds the robot path planning process. This processing converts the tool vector path to a robot path.

Smart Feature Fitting

The smart feature contains the transformation mathematics that orientates its associated elements into the proper alignment with respect to the first element (feature start point). The fitting process provides the additional data that fits that specific feature template into workpiece space. This involves developing and applying the transformation that aligns the feature start point (start element) to the workpiece. Thus the transform provides data that aligns the orientation of the generic process and sensor path plan to the seam that it is to be fitted to. Key attribute points are used to translate the final position of each elements datum point to their final resting place in assembly space (both sensor and process).

Figure 9:
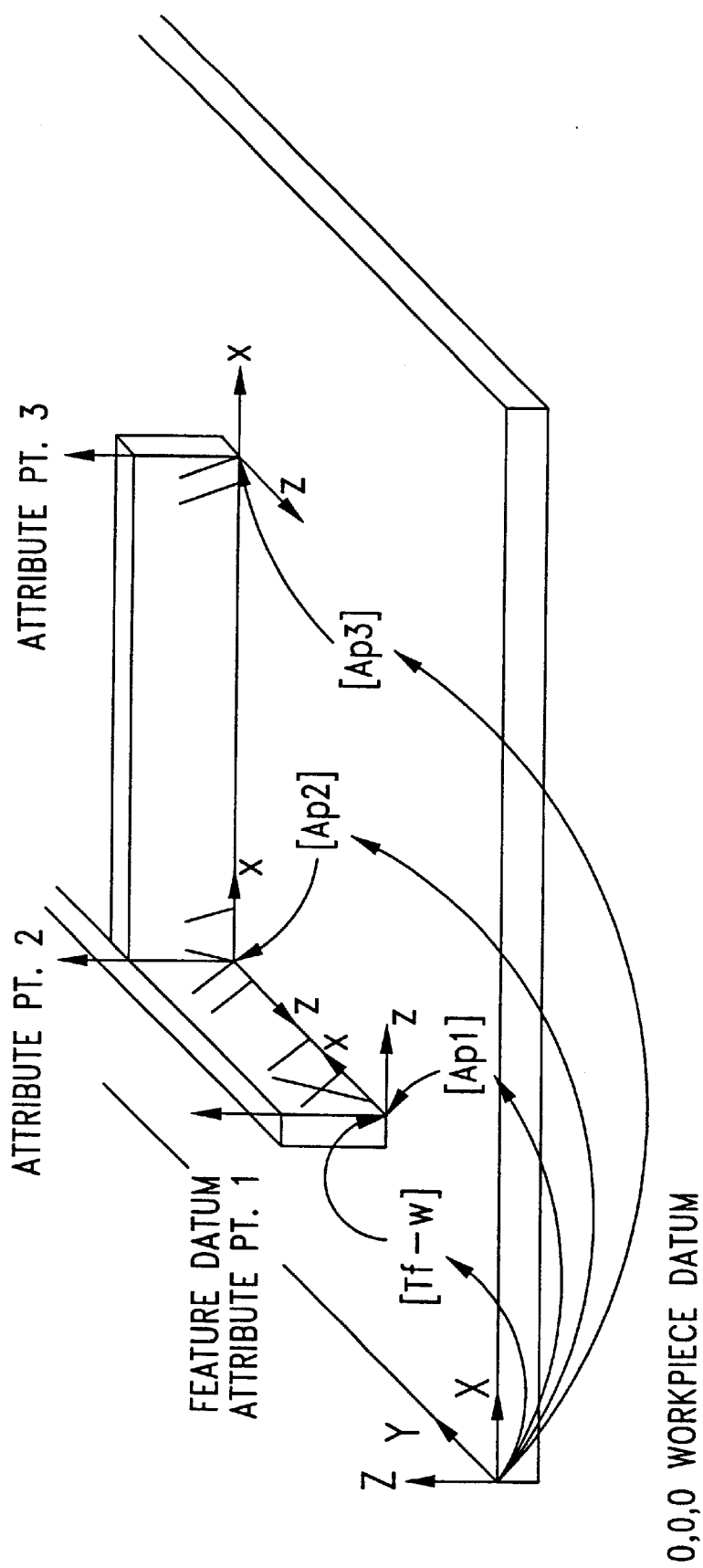

FIG. 9 provides an example of the fitting process. In this example a smart feature template has been created which links 3 elements, a 2 surface corner start element, followed by an interior corner, followed by a 2 surface corner termination element. Here the transform [Tf-w] and attribute point 1 [Ap1] aligns the elements start point to its proper position and orientation on the workpiece. Attributes points 2 & 3 [AP2, AP3] control the locations of elements 2 and 3 in final workpiece space.

The general mathematics governing a smart element fitting operation is as follows:

[points] * [Tp-e] * [Te-fd] * [Tf-w] + [Ap] = finaþlacement on workpiece
         (Control Variables), where

[Tp-e] = process orientation, [Te-fd] = alignment of element of feature datum
[Tf-w] = alignment of element to workpiece, [Ap] = workpiece attribute point

Smart Part Fitting

A smart part generally associates a series of welds, linked to a common coordinate system, to a datum point and orientation on a workpiece. Additionally key parametric dimensions may be used to adjust the process path. As part of the fitting process a transform is applied which aligns the smart feature datum to is proper orientation in workpiece space. An attribute point is then used to position the smart part in workpiece space. Key parametric dimensions are then applied that modify the individual weld (process) and sensor paths to coincide with the component to be welded.

Figure 10:
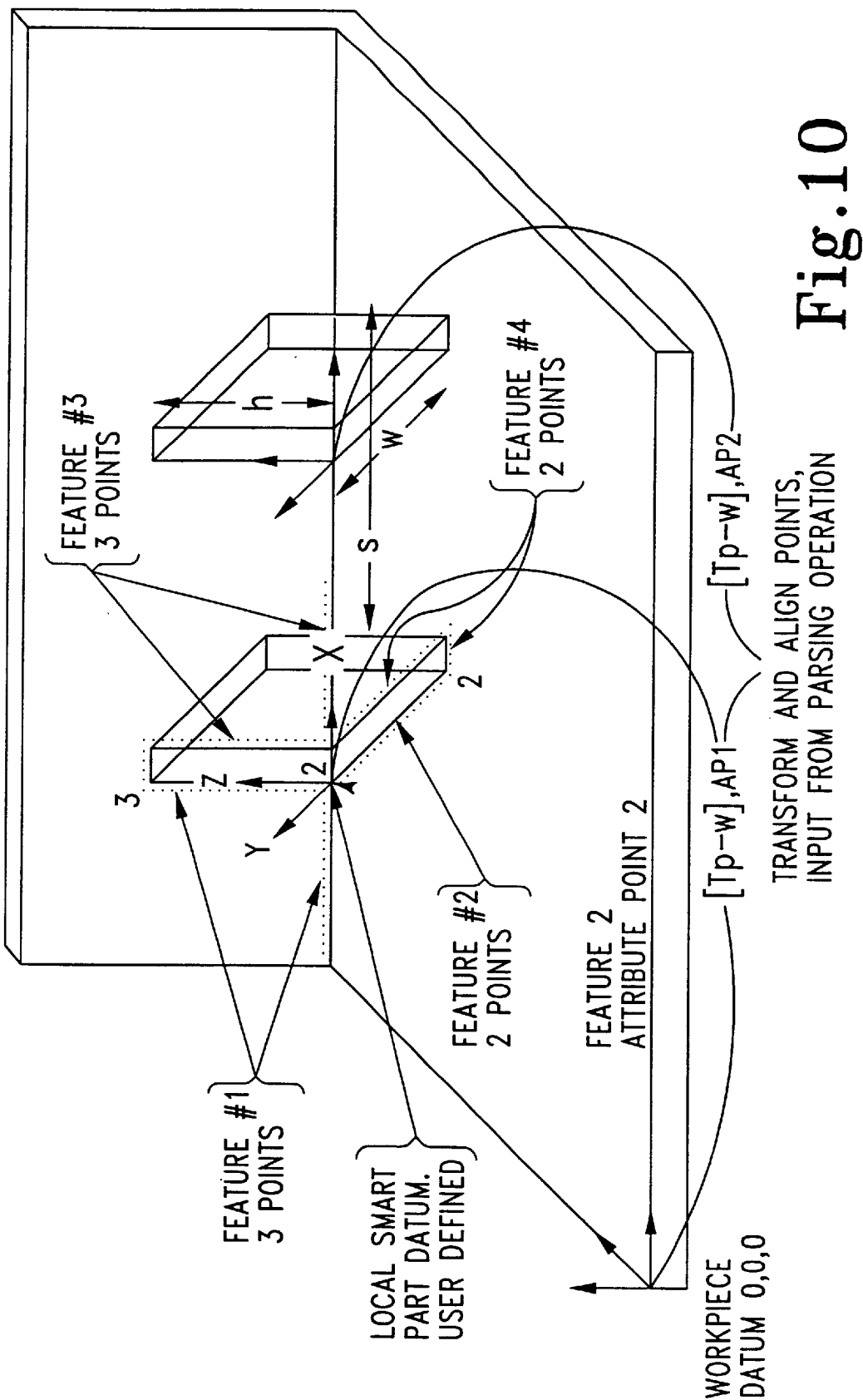

FIG. 10 provides an illustrated example to the fitting operation associated with a smart part. In this example a smart part template has been developed which links 4 smart features. The smart part template provides transform and position data that governs actual path plan generation with respect to the smart part local datum. The attribute points within the smart part can be developed in the form of an expression with respect to parametric dimensions. This provides a means too modify path plans based on the size characteristics of the smart part. Thus the fitting operation dynamically modifies path plans to match the size of the smart part object. For example feature 2, attribute point 2 can be in the form of a mathematical expression as (0, w, 0). The fitting operation then applies transform [Tp–w] to align and offset [AP1] to position the re-sized path plans to their proper location on the workpiece.

The general mathematics governing a smart part fitting operation is as follows:

[points] * [Tp-e] * [Te-fd] * [Tf-sp] + [Ap] * [Tp-w] = final placemen
         (Control Variables )          (parametric dimensions)

[Tp-e] = process orientation, [Te-fd] = alignment of element to feature datum
[Tf-sp] = alignment of element to smart part datum, [Ap] = workpiece attribute point
[Tp-w] - alignment of smart part to workpiece In certain instances a smart part may be rubber stamped at several locations on the workpiece. In this instance, the rubber stamp function provides a means for duplicating a path plan by simply changing the axis location of the robot transport device. This function saves the reprocessing of a smart part and its associated expansion into a robot path plan.

Path Expansion into Robot Space

The path plans generated by the fitting process are in terms of tool vector attached to the workpiece. These path plans must be then converted into robotic path plans (6-DOF). The robot path plans must be developed in terms of the specific workcell and must account for any part or robot positioning devices.

Initial Robot Position to Workpiece

Figure 11:
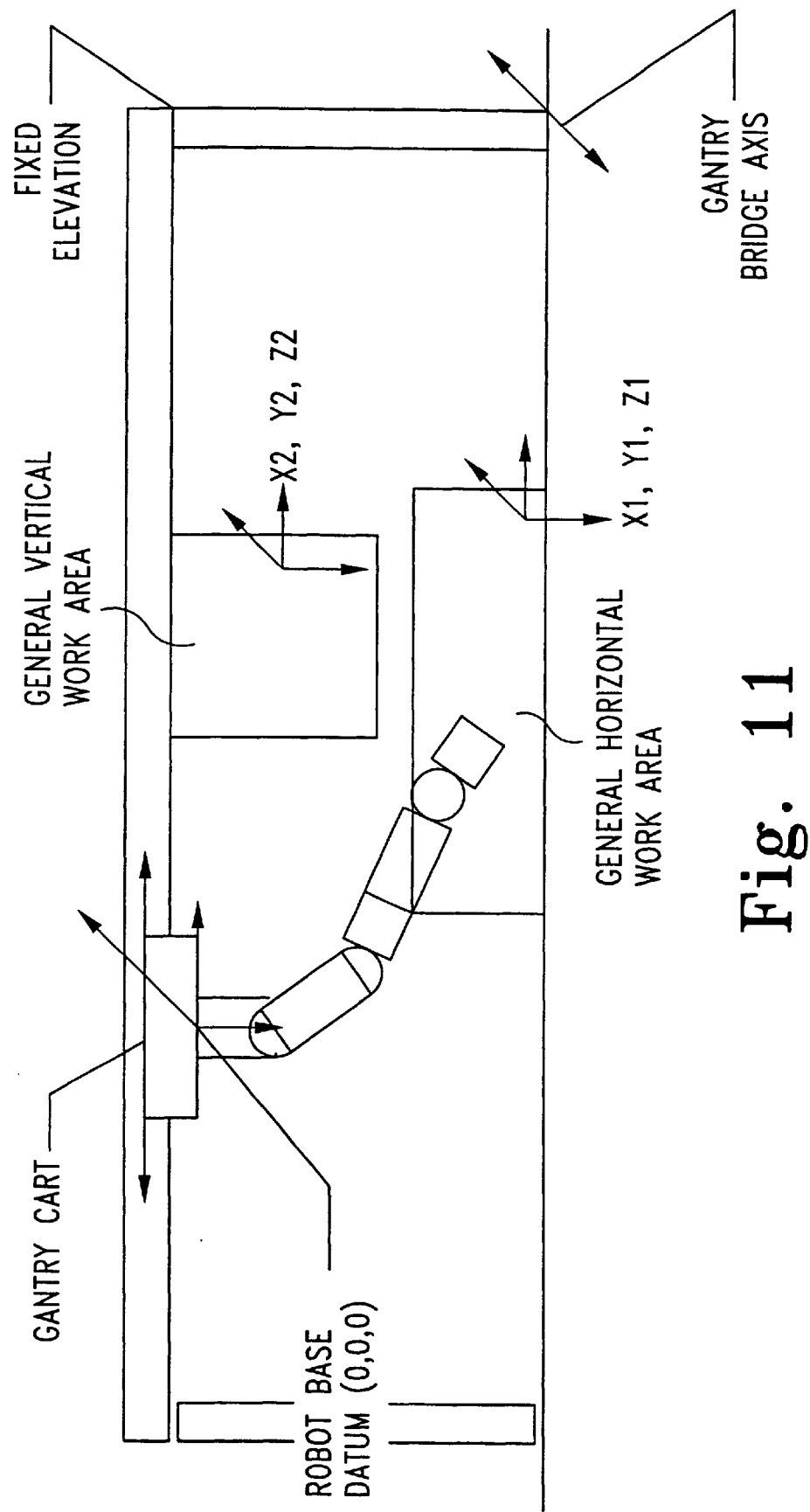

It is assumed that a certain amount of data, in the form of general rules, is embedded within the workcell database. This rule-based data is provided to give the system a head start in the automatic planning operation. These rules provide robot base offset data to optimum robot reach based on position of the robot and workpiece. For example the following rules may be provided for the portable arm robot, mounted in an inverted fashion to a gantry positioner as illustrated in FIG. 11.

For example the workcell configuration data set might contain the following rules in regard to nominal start position;

| Rule | characteristics | offset |
|---|---|---|
| 1 | horizontal position, panel weld, forward facing | X1, Y1, Z1 |
| 2 | vertical position, egg-crate structure, . . . | X2, Y2, Z2 |
| 3 | use this | X3, Y3, Z3 |
| others | | |

Note the workcell type implies data in regard to arm reach, up-right or inverted mount, etc. The rule provides a nominal start position based on general reach conditions. The final position shall be determined by actual robot reach requirements. In certain conditions the workcell might fix the position of the robot to the workpiece or workpiece fixture. Under this condition a reach study is usually required which optimizes this position based on reach and access to all the seams that need be processed.

Robot Transporter Management

Based on workcell configuration and offset knowledge the system shall proceed to place the robot by positioning the transporter axes to obtain the nominal offset between robot and seam. Typical transport devices include 2 and 3 axis gantry devices and track devices operating in an upright or overhung position. Transport axes exist in two forms, index motion and servo motion. The initial release will deal with index devices with servo positioning being handled under a future release. The first order of processing is to establish the robot according to any fixed elevation. If this position cannot be obtained the closest available position shall be determined. Based on actual reach and collision this position may be modified as part of the robot program generation process.

A means must be provided which allows a redundant feature or part plan to be easily and quickly repositioned on the assembly. This is common in cases where the same feature can be repositioned by changing the location of the robot positioning axes as a function of the difference in the location of the start element from the first occurrence. This technique will be applied through a rubber stamp utility feature. In a rubber stamping operation the system will develop a suitable robot transport axis offset based on direct a generated axis offset. The offset may be developed through direct data input, developed through solid works processing or from information in the design database.

Robot Path Plan Development

Once a position and orientation of the robot has been established relative to the workpiece the system will proceed to automatically generate a set of path plans for the sensor and process tool. At this point the parser has established two complete path plans, sensor and process. Each of these path plans provides the near process approach and departure poses. The system proceeds to convert the sensor tool vector path plan to a series of robot poses, one pose for each tool vector pose. The robot plan shall be generated in a generic form containing pose and function attributes in a neutral format, see appendix A. Each pose uses the corresponding tool and associated TCP (tool center point).

The path generation process is an automatic function that develops the robot path plan in the robot global coordinate system. The primary function of this process is resolving redundant axis motion. The path plan must be run through high-speed simulation to check for collision. In the initial release of A-ROPPS, collisions shall be automatically detected resolved through manual reposing of the arm. This can be accomplished using the simulation and teach modification tools.

Future releases of A-ROPPS will provide a means to automatically resolve collisions through intelligent manipulation of redundant axes and transport devices, and deviating from optimum process pose.

Once the path plans (sensor and process) have been developed and verified, they are stored in separate files for further processing. Additional processing will resolve issues in regard to command format, RC-10 format, offset buffer management and process assignment.

Upon conversion of the tool vector path to a robot path the system will query to assign a process specification to the process path. For example, upon processing a weld path for a given feature a weld specification must be assigned to it. This can be accomplished via direct query and data input or selection or imported through the design database or manufacturing database. The specification is a text entity that matches that described in Cybo publication, 'Weld Specification using AWS methods'.

Process Schedule Assignment

Once the path is located in final assembly space, a process plan (schedule) must be developed based on weld specification and weld position. This is because most process data is dependent on the position of the process path, as it will be processed by the robotic system. For example a specific weld specification calling for a 7 mm.-fillet will reference different process boundary model based on the position of the weld (vertical-up vs. horizontal). Process schedule assignment shall have three avenues; manually assigned, assigned via neural net processing, automatic by association with trajectory direction. Manual assignment will be under first release along with an alpha implementation of the neural-net method. The neural-net method will return process boundary conditions based on process variables including weld type and size, expected fit-up variations, and process orientation. The manual method will rely on direct assignment of a process schedule number from a library of schedules that have been previously established.

Scheduled for both adaptive and non-adaptive welding will be supported.

Part Positioner Axes

For the first release it shall be assumed that the part assembly is in a stationary fixture. i.e. no coordinated motion of the assembly with robot motion. However future release of A-ROPPS will require velocity coordinated part motion. Typically motion of this device will be either pre-programmed as a robot path or resolved through simulation, as attribute points are determined. Active positioning requires that the positioner be move into a position at key points along the features path. Thus additional elements may be required to allow integration of positioner moves. Typically at each positioner will be coordinated with elements called out in the feature model. The associate part positioner axes data must follow the datum point for each clement. These moves will be merged into the final robot path plan.

RC-10 Program Generation

Offset Buffer Allocation (Dynamic and manual)

A-ROPPS will automatically generate offset buffer allocation as it processes each smart feature or smart part. The following general guidelines are provided in regard to the numbering system. These guidelines provide a means suited for dynamic allocation and generation of offset buffers providing that the process elements and sensor elements are tightly coupled.

Global Offset Buffers

Offset buffers 1–4 have been allocated for system level, global use. The plan is for the RC-10 to automatically offset all jobs and paths by offset buffer 1. Offset buffer 1 (OB1) is automatically processed as the sum of buffers 2–4. OB2 is allocated for external global registration. That is any external sensing such as what would be used by a GPS or gantry system. OB3 is reserved for local-global registration. That is it results from a sensor job that is executed first for the purpose of pre-location of a feature or part, a sort of pre-scan. This sensor job uses a special scan element (Global scan) that performs a sensing plan and develops an offset that is stored in OB 3. This element is processed and executed as the first job. It generates and local-global offset that is automatically used by subsequent jobs as a compound offset. Offset buffer 4 is reserved for future use.

Run-time Buffer Allocation

Buffer numbers shall be allocated in a sequential manor. For example the base offset buffer number for a given element may be derived as:

[[[(smart part #–1)*100]+(feature #–1)*30]+(element #*5)]

This allocates buffer number 5 to the first (weld on) element of the first feature, then 10 to the next element, and so on. The buffer numbers in between (6–9), (11–14), etc. can then be allocated to the actual intermediate scan processing points for that element. For example fillet followed by an edge scan for that associated element might use buffer 6 for the fillet, 7 for the edge and then combine them into buffer 5 which controls the process offset. Note that a common (unique) smart part job will reuse the same offset buffer numbers.

If a process element is encountered that does not reference a sensor element then the offset from the previous sensor element shall be assigned (copied) to that process elements assigned offset buffer.

Axis priority is given in the order of when the scans and probes occur. That is a fillet scan followed by a second scan will use the first 2-axes from the first scan and the remaining axis from the second scan. This applies to the mix of both probe and scans. A-ROPPS must manage the coordinate axis of the generated offset base on element datum conversion to final workpiece space.

Manual Buffer Allocation

In some restrictions or inefficiencies in automatic development of path plans may interfere with the automatic allocation of buffers. For instance automatic allocation limits one offset buffer to govern all the points within an associated process element. With that a method is provided which allows manual allocation and manipulation of offset buffers at the element level. Note that this method of manual allocation could limit the re-use of elements in other applications. This method provides a means to incorporate buffer assignments and manipulation of offset buffer data in a generic sense. The path planner will still need to post process buffer assignments into the proper format as is the case for all generic command functions. This method provides a means to allocate (assign) an offset buffer at the point level using a field in the smart element point records (Off Buf). It also provides a means to form logical expressions to combine buffer data. The element point records also provides a generic process field (Proc Data) for this alphanumeric expression. This field is used to manually govern the formation and allocation of offset buffers in the case of sensor preview sensing elements. This expression is used to manually covering the formation and allocation of output buffers.

For example the process elements may be assigned a specific buffer number. The following example is provided in Table 6.

TABLE 6

Start Process element assigns offset buffer 6 to all points in that element

Off Buf: 6
Proc Data: n/a

TABLE 6-continued

Start Process element assigns offset buffer 6 to all points in that element

Associated sensor buffer has two scans assigned as follows:
Scan 1    process fillet {4, MB, -, Y, Z}
This scan generates an Y-Z offset into buffer 4
  Off Buf: n/a
  Proc Data: 4
  Scan 2    process edge {5, MB, X, -, -}
This scan is offset by buffer 4, generates an X offset into buffer 5, and forms a composite offset into buffer 6
  OB: 4
  ProcData: 6 = 4 + 5

Note the final format of the process command string will be a function of the final version of the generic robot command language that is related to the final RC-11 command language format.

RC-10 Path Formatting

Once the collection of generic robot paths is complete, they must be converted to RC-10 format. The conversion process must take the generic form of each generated path and develop it in the format of a RC-10 job. The format for the generic path and final RC-10 path will be provided under separate cover.

Robot Program Segmentation/generation

Upon completion of RC-10 path conversion for all the various features and parts a composite path plan must be assembled in the form of a robot executable program. This involves piecing all the paths, jobs in a specified sequence of operation. A baseline robot program structure must be generated which references the executions along with proper calls to generic functions, i.e. tool selection, and which establishes a proper pounce point.

Figure 12:
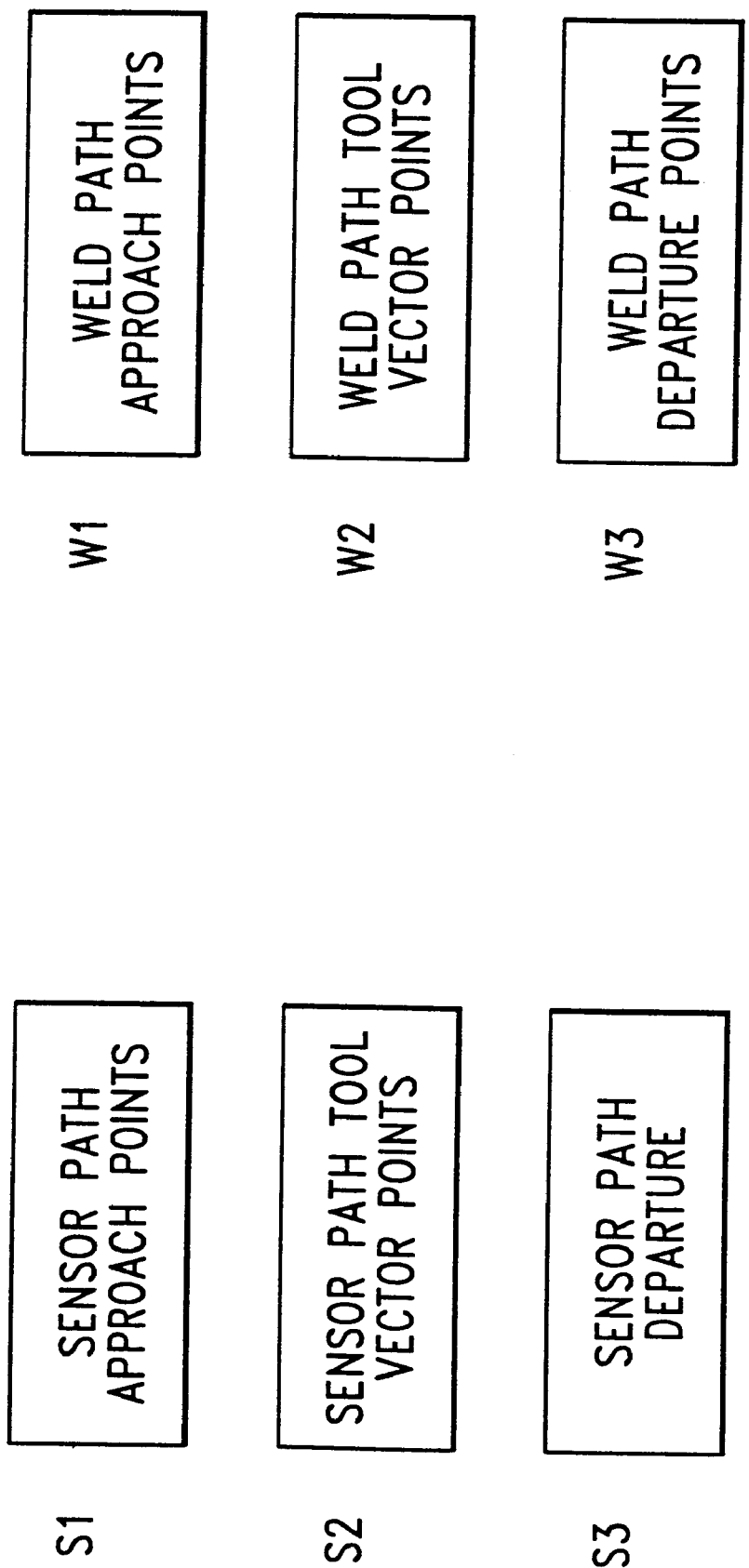
Figure 14:
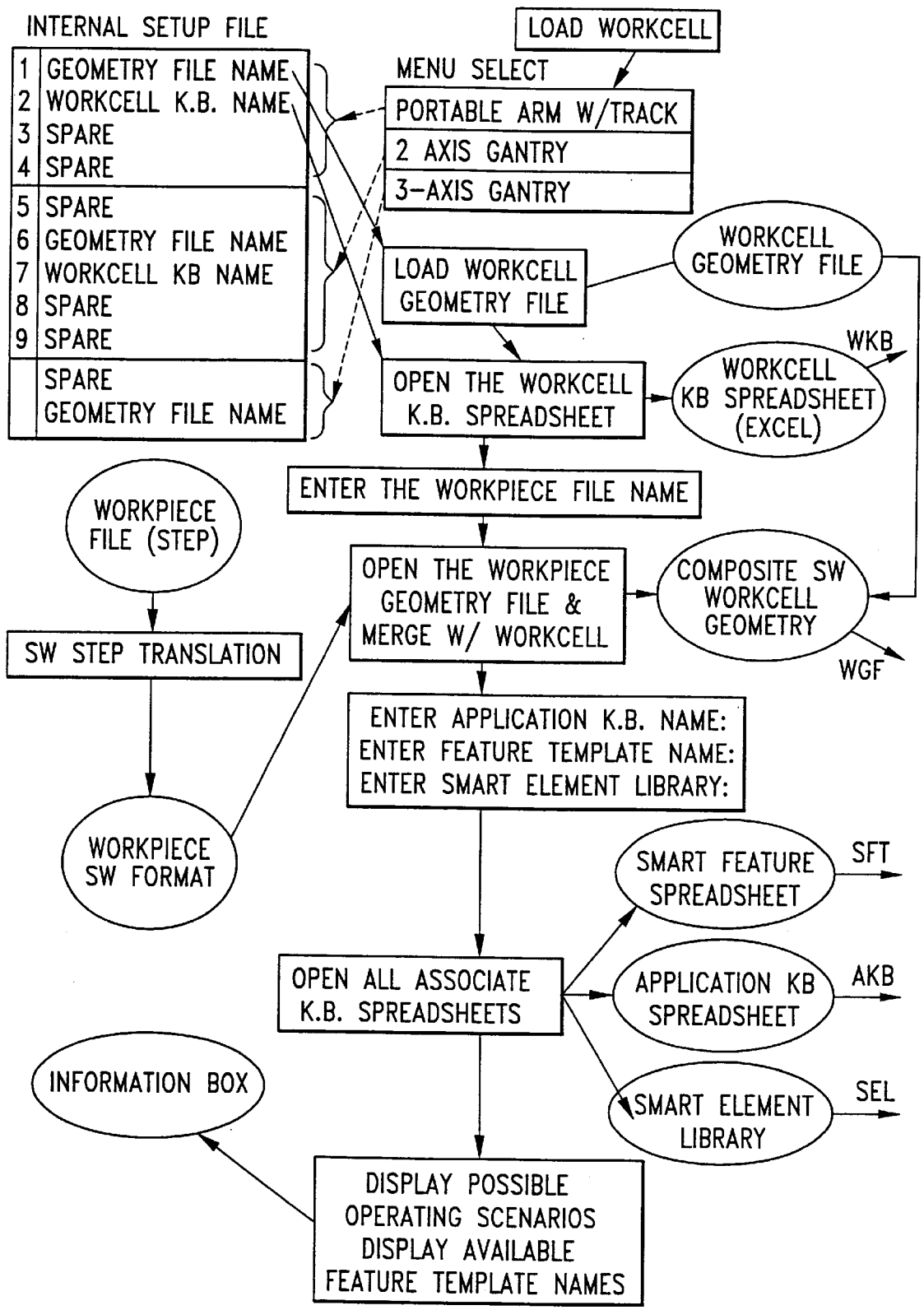
FIGS. 14–19 show various exemplary flow diagrams of an exemplary embodiment of the present invention.
Figure 15:
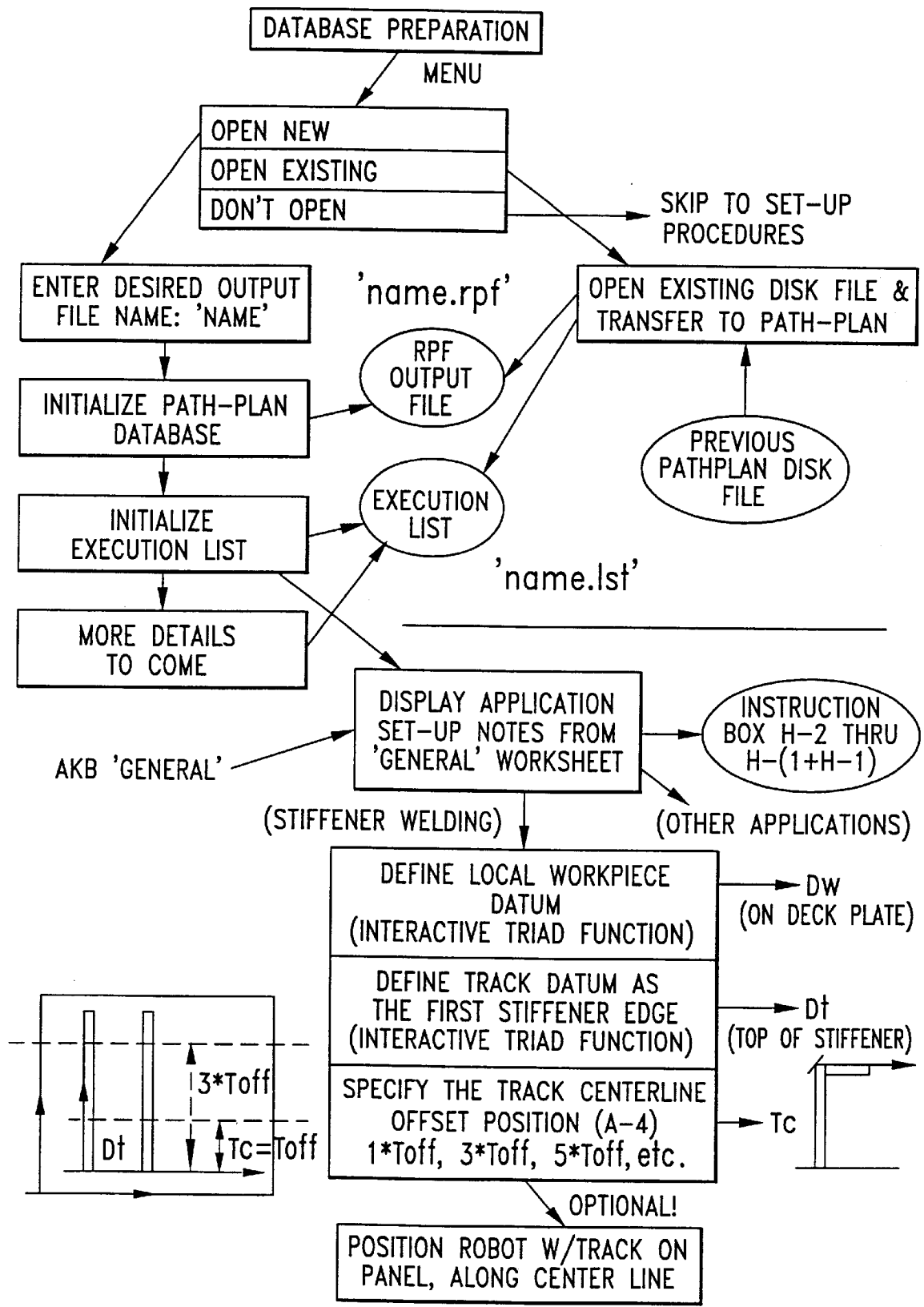
Figure 16:
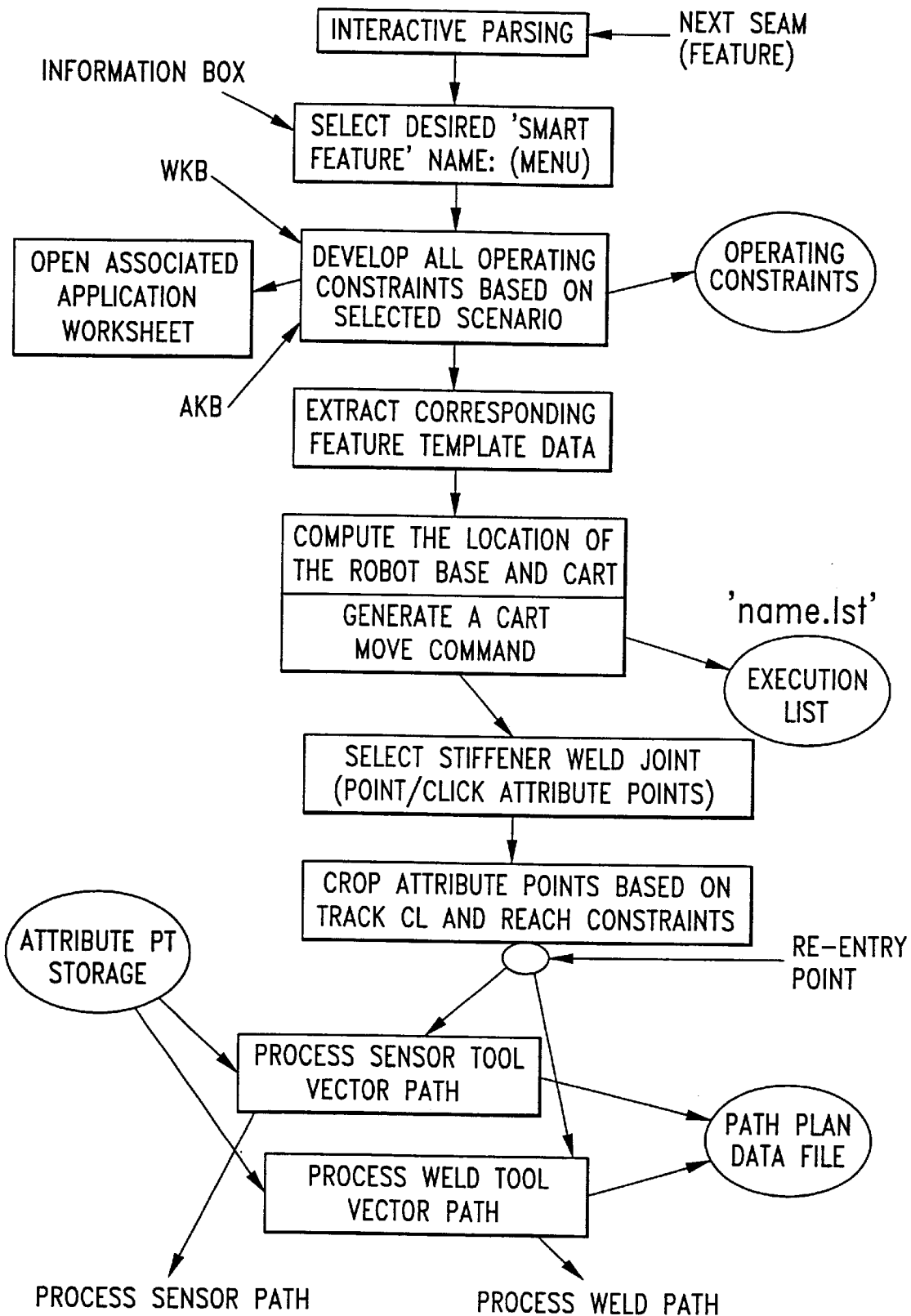
Figure 17:
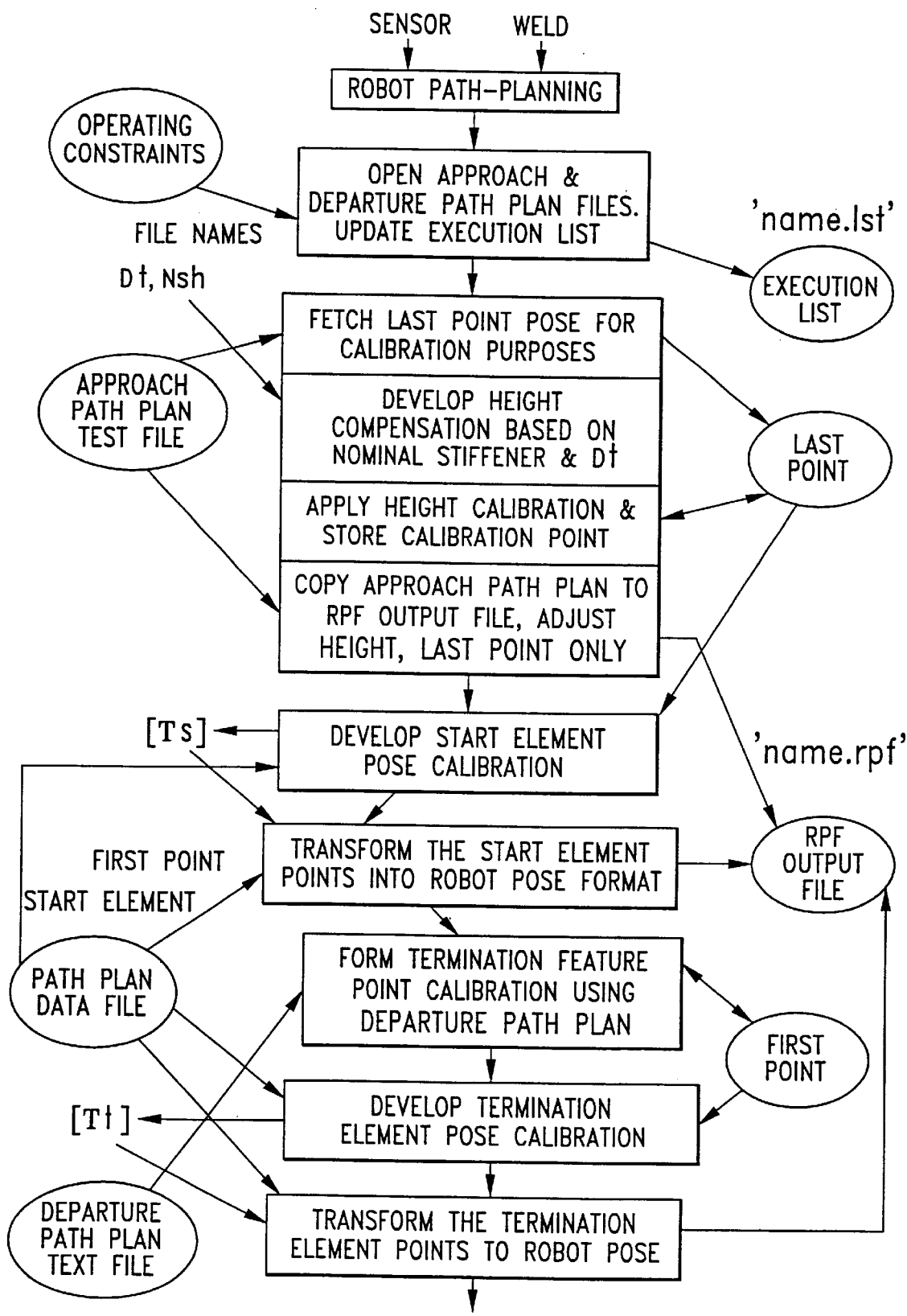
Figure 18:
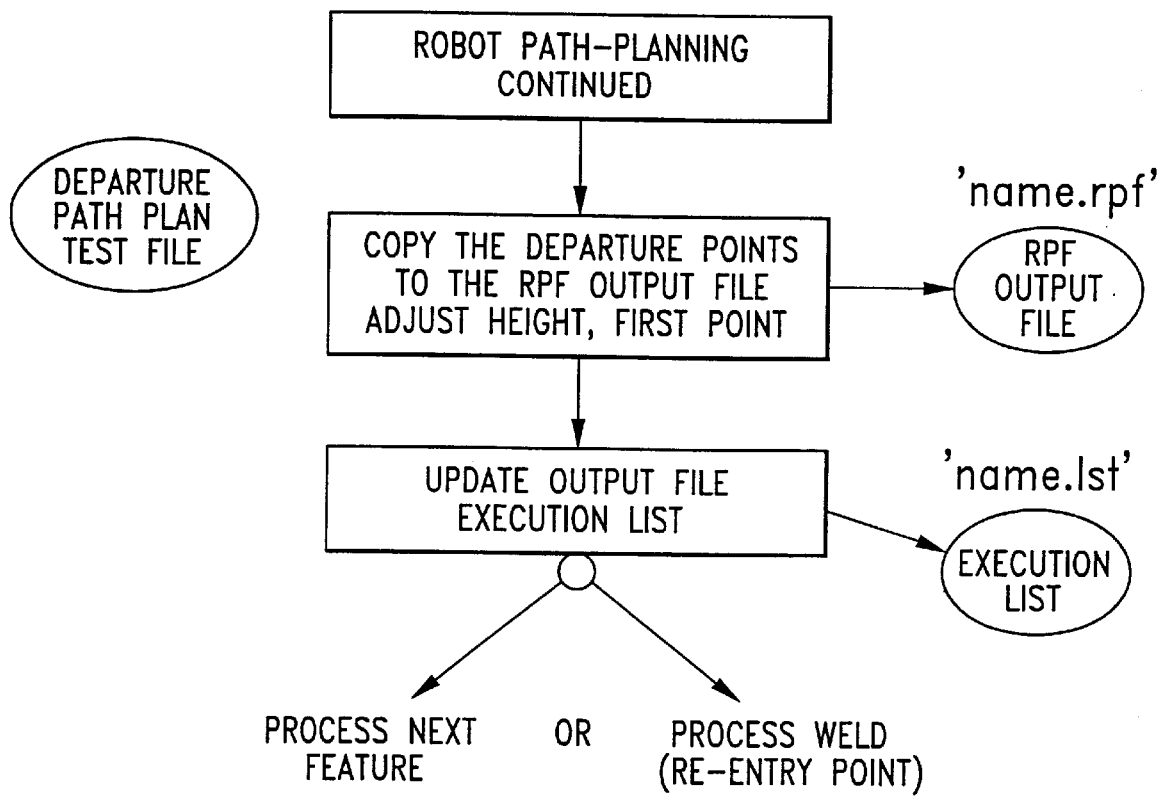
Figure 19:
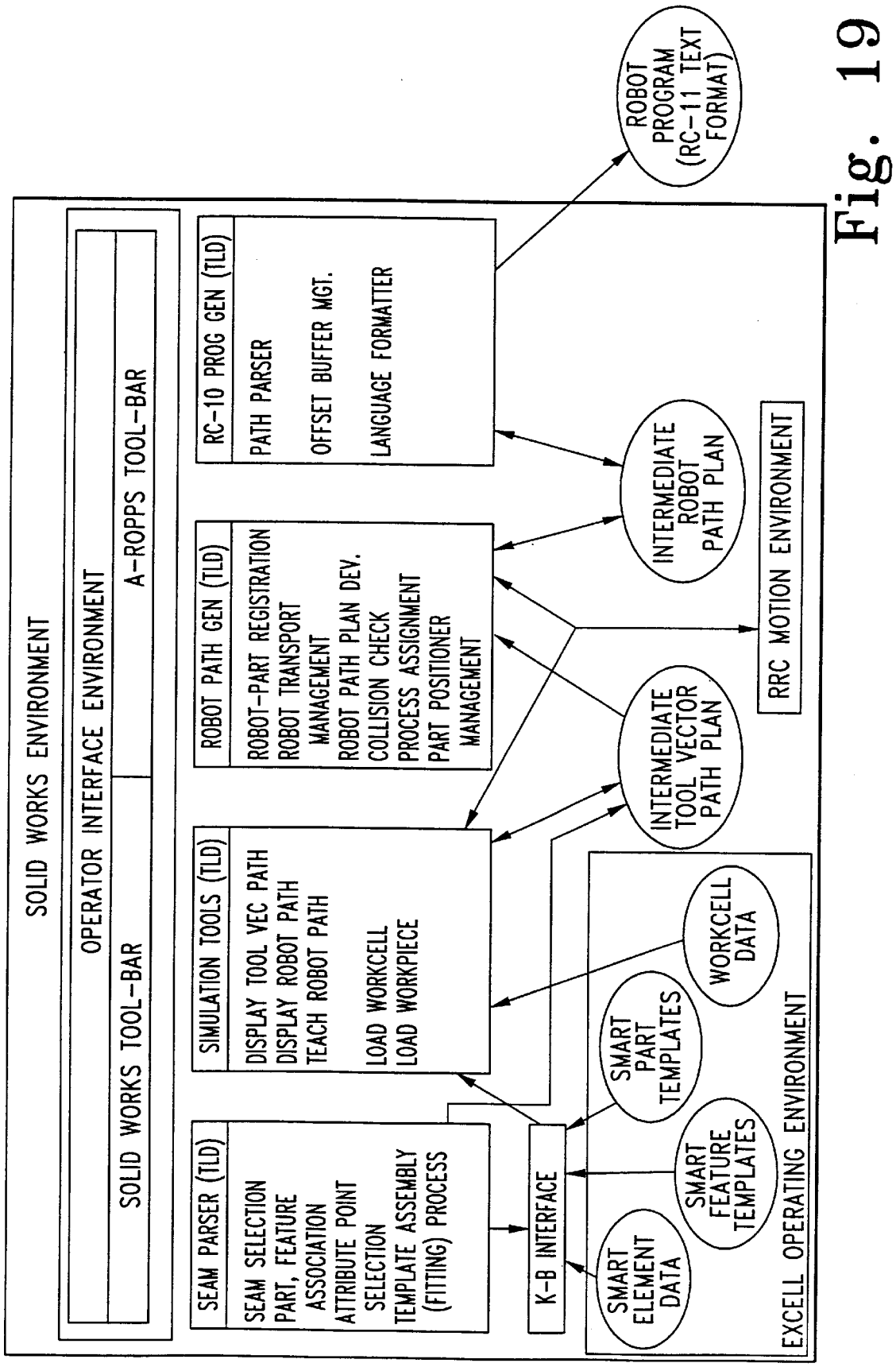

FIGS. 12 et seq. Relate to a specific embodiment of the present invention. The specific embodiment of the method will allow somewhat flexible knowledge based path planning without the use of the integrated RRC motion environment. This method takes advantage of the fact that the global approach and departure path contains a good deal of information in regard to process and sensing path planning. Currently the application knowledge base contains a series of points, in RC-10-R format, in regard to approaching and departing the seam. Under this new operating scenario the last point in the approach path shall be programmed such that it is nearly coincident with the position and orientation of the local approach point in the start smart element. Likewise the first point in the global departure path shall be nearly coincident with the local departure point in the termination smart element. In both cases these points in the global paths shall be programmed to reflect its process operation (sensing or welding) as taught in the smart elements.

Example: the last point in the global approach path (sensor) shall be programmed to match the position and orientation of the corresponding start sensor elements' local approach point.

The associations of these two point pairs can be used to formulate the relationships between the elements path points to the seam attribute points to the robot base frame. Then all point's associated with that smart element would take on the joint angles of the global path point. Likewise, all points in the termination element would take on the joint angles of the departure path point. There is enough data available in the programmed point to automatically generate the Cartesian position and orientation for all points within the smart element. This should work pending that process orientations are constrained within limits. Corner wraps may violate this, but happen in an area where the robot has more room to roam, i.e. not under the center of the track system.

Note that the software may only use joint angles as an approximation for resolving redundancy (Cartesian moves only). Joint Angles do not have to exactly reflect the Cartesian TCP.

The big unknown occurs as the weld is progressing along the seam. The torch geometry may cause some dramatic changes in wrist orientations creating potential wrist flip or unstable conditions. We need to test this condition as soon as possible. One possible solution to this is to add a center element, at the center of the travel, which contains two points separated by 6 to 8 inches. The first point would take on the joint angles of the approach and the second would take on the joint angles of the departure.

Table 7 below describes a robotic process planning procedure according to the present invention. FIGS. 14–19 provide illustration of the same.

TABLE 7

1. Load

Select workcell       [portable arm on mini-track]
System loads workcell geometry [step file] and associated operating knowledge base [excel file].
Select workpiece data file (geometry) and associated application knowledge base [excel file].
System loads & displays geometry file and loads application knowledge base.

2. Setup

Specify/allocate an execution list (text file)    (note 4)    [start new, open old, no list]
Add any initial execution/definition commands to the program list (note 2) ['define progA', 'start progA'].
Generate a home cart command ['ext_index, home'].
Display the set-up instructions that are contained in cells G4 thru G6 of the
workcell knowledge base [excel spreadsheet]. The stiffener application will be as follows:
Define the local workpiece home datum (via triad alignment).
Designate the reference stiffener for the track, mold line and stiffener height (top surface). This will correspond to the track's clamping datum. Note the track clamp always locks onto the non-mold line side of the flange surface.
Specify the track centerline location and direction with respect to the workpiece origin. The centerline position is a function of the robot reach (found in the application knowledge base) and the workpiece origin.
Parallel motion of the track is a manual operation by both the A-ROPPS programmer and the site operator. A means, such as text comments in the execution list, must be used to convey the track placement to the site operator.
Solid Works (system) places robot & track into designated workpiece location (composite file). (Do this last, we don't need if there is no inverse path planning or simulation).

3. Parsing operation

Select a stiffener line for processing.
Display the possible operating constraints found in elements G2–G5 of the application knowledge base. These are in the names of the various spreadsheets that contain data in regard to that particular operating scenario.
Select the desired operating scenario i.e. forward/right, forward/left, etc.).
Open the associate worksheet form the application knowledge base spreadsheet.
Display the associated operating constraints from that sheet (elements E1 through G6).
System determines the cart location for this feature. (forward/back distance from the selected weld line, element E1).
The display system (Solid Works) moves cart to proper location. (optional but nice to have for visual feedback)

TABLE 7-continued

Generate generic command to move the cart to desired absolute position ['ext_index, movea, xx.xx'] and place on the execution command list.
This must be a no move type point.
Is this feature a rubber stamp of a previous job set?

No (new job and path plan files)

Open a new job file (one for sensor and one for weld), as required by the program/job list  (note 3) ['execute job A', 'define job A']
Select the associated Smart Feature template
Select the seam and associated attributes points for the desired seam that matches the selected operating quadrant.
   Process the feature, to generate both the sensor path and the weld path.
Select tooling operation. [tool 1 for weld torch, tool 1 (weld torch) for sensor]
Insert a ['tool, select' command] on the job list.
Open a new path file, W1 or S1 as required by the job/path list   (note 4) ['execute path 1', 'define path 1']
Create a new path using the approach points from the AKB (Application Knowledge Base).
Close the path and make associated entries into the path list.
Open a new path file, W2 or S2 as required by the job/path list, for the sensor and weld paths.
   Process each sequential sensor elements and then each sequential weld elements.
System fits the designated Smart Element, as specified in the Smart Feature, to the attribute points resulting in a Tool Vector path plan. Store tool vector path plan into its associated path file W2 or S2.
After the last element is processed close out the path plan ['end path'].
Open a new path file, W3 or S3 as required by the job/path list.
Copy departure points into path W3 or S3.   (note 4)
Close out the path plan and update the path list.
(FIG. 12 shows and example of the output path file structure.)

4. Robot path generation

Process the Tool Vector path plan (path W2 or S2) into a robot path. Use the information from the last approach point (S1) and first local approach point (S2) for calibrate and convert the first features points (Sn1–Snn) to robot form. Use the information from the last sensor path point (S2) and
the first global departure point (S3) to calibrate and convert of the last features points (Snn + 1–Sm) to robot form.
Perform similar calibration conversion on the weld path points, substitute W for S.
Link 3 paths into one    (note 5) Optional!!
Post process the 3 sensor, or 3 weld, robot path plans into RC-10 (Bender) format.
Return to step 3
Yes (Rubber Stamp of a previous job file)

Ask for job name to be stamped
Insert proper 'execute, job' commands in the execution list.
Return to step 3
Finished Notes:
(2) A program is a collection of jobs that makes all welds from a stationary track location.
(3) A job is the collection of paths required to process a single feature. It will typically have 3 paths for sensing and 3 for welding.
(5) We can elect to merge these 3 paths into 1 resulting in 2 paths per job. Use whatever is easiest to implement.
(4) A path is a collection of points that performs some specified function. In this case the same path could be used for the sensor and weld approach path and for the sensor and weld departure path. Once the path is created an 'execute path n' in the job list is all that needs to be generated.
(1) Typical execution list is given in FIG. 13

FIGS. 14–19 show an exemplary operational flow diagram of a specific embodiment of the method of generating a robotic process plan according to the present invention.

Appendix A attached hereto shows a Welding elements, baseline library that may be used as robotic process elements according to the present invention.

It will be appreciated that the above-described embodiments are merely exemplary and that those of ordinary skill in the art may devise their own implementations that incorporate the principles of the present invention and fall within the spirit and scope thereof.

Welding elements, baseline library

Start elements

*Three surface corner type starts*      Class Name = W3SC-S-type-rev

Input Control Variables (use based on type)
d, s

- Pass-thru (d,s)    - weld passes through end surface by d mm. in −X direction. Adjacent snipe = s mm radius.
- Surface (d,s)    - weld starts d mm. from the corner in X direction, s = n/a.
- Snipe (d,s)    - weld wraps around snip by d mm. in −z direction, s = snipe distance.
- Wrap (d,s)    - weld wraps corner by d mm. + = +z direction, - = +Y direction, s = n/a.

Name: W3SC-S-Pass-Rev
Type: Pass-thru
If d = 0 then point 2 will start at 0,0,0 the theoretical intersection.

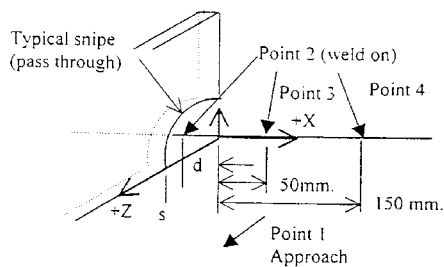

Name: W3SC-S-Sur-Rev
Type: Surface
If d = 0 then point 2 is in the corner.

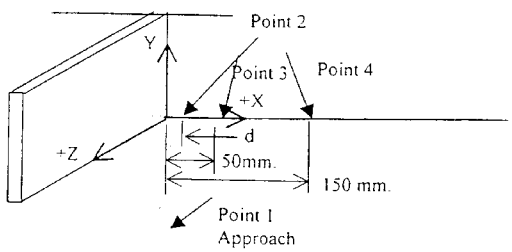

Smart Element Library            8A-1

Name: W3SC-S-Snipe-rev
Type: Snipe
Points 2&3 should be orientated to handle smallest expected snipe radius.
If d = 0 (no wrap) then use a standard corner or relocate point 2 to point 3 and delete point 3 from the plan.
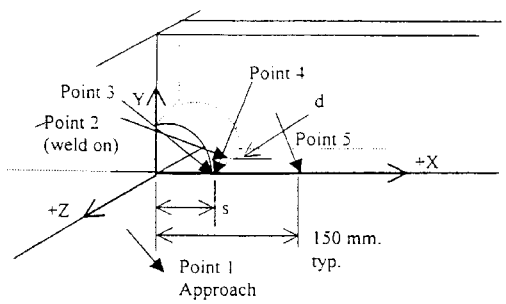
Name: W3SC-S-Wrap-Rev
Type: Wrap
If d = 0 then point 2 (weld on) shall relocate to the corner and point 3 may be deleted from the plan.
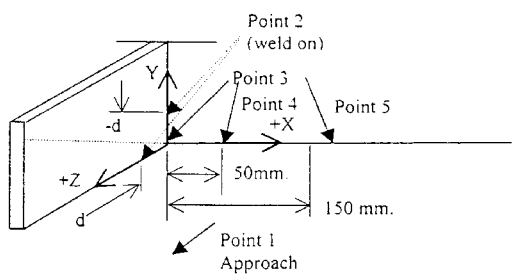
Smart Element Library

*Two surface corner type starts*     *Class Name = W2SC-S-type-rev*

Input Control Variables (use based on type)
snipe radius (s), wrap (d):
  Standard (d,s)  weld extends +/- d beyond the corner datum. X direction.
  Snipe (d,s)     weld wraps around snip by d mm. in –z direction, s = snipe dist.
  Wrap (d,s)      weld wraps corner by d mm, + = +z direction, - = +Y direction.

*Name: W2SC-S-Standard-rev*
Type: Standard
If d = 0 then point 2 (weld on ) starts at 0,0,0 (the local datum).

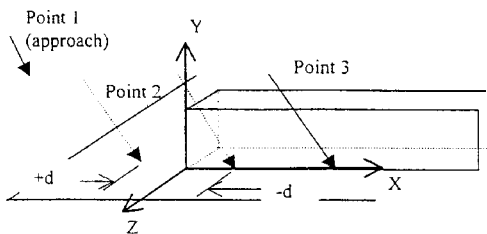

*Name: W2SC-S-Wrap-rev*
Type: Wrap
If d = 0 then a standard corner could be used or points 2 and/or 3 may drop from the plan.

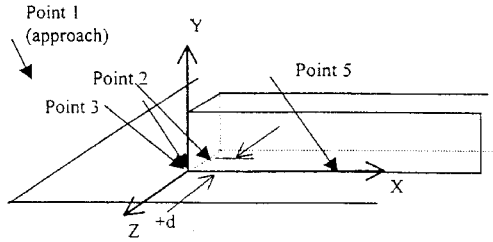

Smart Element Library

*Name: W2SC-S-Snipe-rev*
Type: Snipe

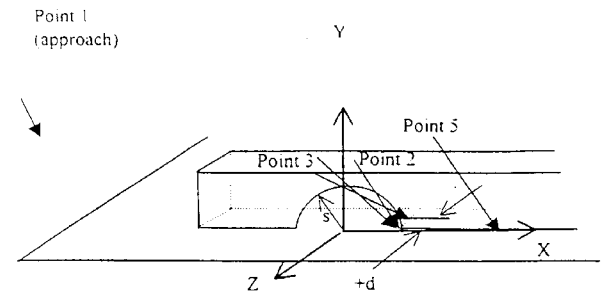

Termination elements

*Two surface corner termination*     *Name: W2SC-T-type-rev*

Input Control Variables (use based on type)
snipe radius (s), wrap (d):
    Standard (d,s)  weld extends +/- d beyond the corner datum, X direction.
    Snipe (d,s)     weld wraps around snip by d mm. in –z direction, s = snipe dist.
    Wrap (d,s)     weld wraps corner by d mm, + = +z direction, - = +Y direction.

*Name: W2SC-T-Standard-rev*
Standard end

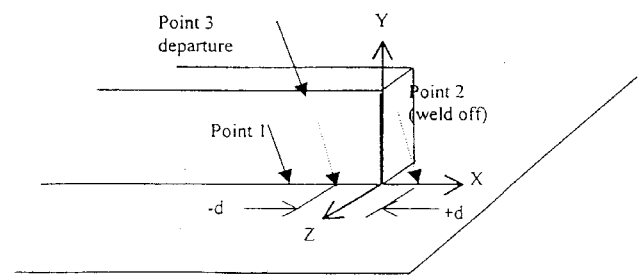

Smart Element Library

*Name: W2SC-T-Snipe-rev*
With Snipe
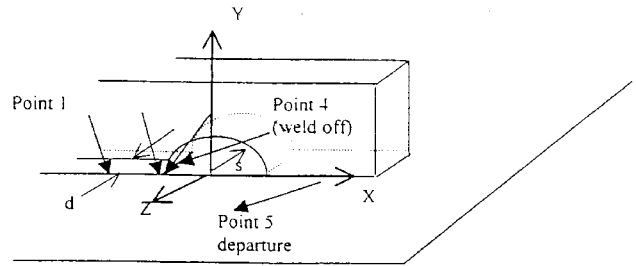
*Name: W2SC-T-Wrap-rev*
With Wrap
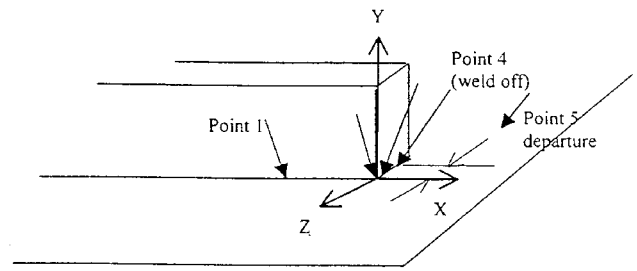
Smart Element Library
A-5

*3 Surface Corner type terminations*     *Name: 3SC-T-type-rev*

Input control variables (use based on type)
snipe radius =s, wrap = d

- Pass-thru (d,s) — weld passes through end surface by d mm. in –X direction. Adjacent snipe radius = s mm.
- Surface (d,s) — weld starts d mm. from the corner in +X direction.
- Snipe (d,s) — weld wraps around snip by d mm. in –z direction, s = snipe distance.
- Wrap (d,s) — weld wraps corner by d mm, + = +z direction, - = +Y direction.

Name: W3SC-T-Pass-rev
Type: Pass-thru
If d = 0 then point 2 will stop at 0,0,0 the theoretical intersection.

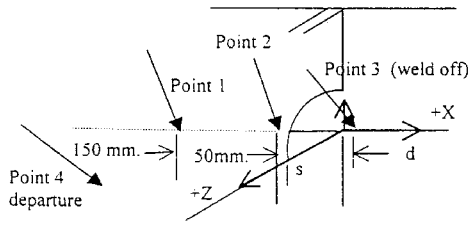

Name: W3SC-T-Surface-rev
Type: Surface
If d = 0 then point 2 is in the corner.

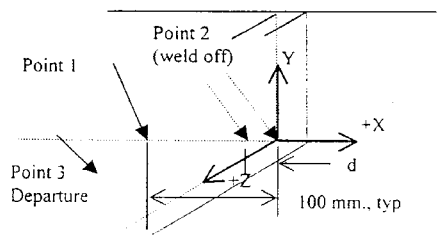

Smart Element Library

A-6

Name: W3SC-T-Snipe-rev
Type: Snipe.
Points 3 & 4 should be orientated to handle smallest expected snipe radius.
If d = 0 (no wrap) then use a standard corner or relocate point 4 to point 3 and delete point 3 from the plan.
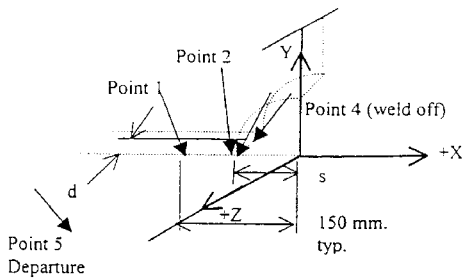
Name: W3SC-T-Wrap-rev
Type: Wrap.
If d = 0 then point 3 (weld off) shall relocate to the corner and point 2 may be deleted from the plan.
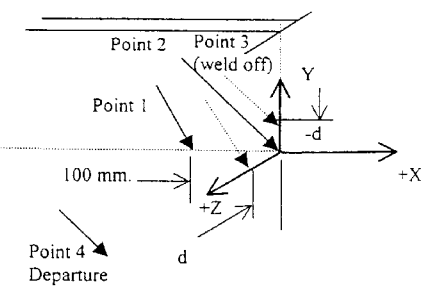
Smart Element Library

Travel Elements
*Straight line*      Name: *WSL-rev*
This point could be a continue point, or an adaptive control point linked to sensor feedback.
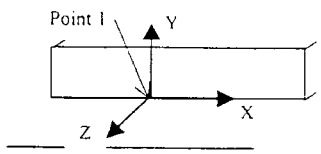
*Concave curve*      Name: *WCCC-rev*
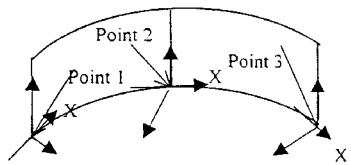
*Convex curve*      Name: *WCVC-rev*
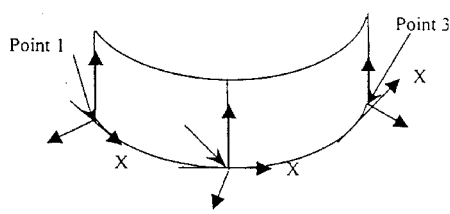
*Interior corner*      Name: *WINC-L/R-rev*
         (left handed)          (Right handed)
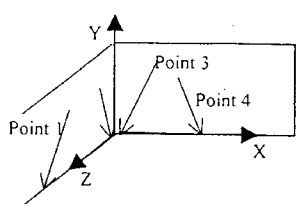 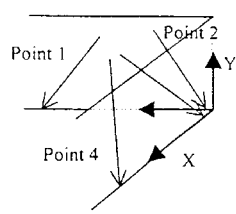
Smart Element Library

*Exterior corner*     *Name: WEXC-L/R-rev*
    *(left handed)*            *(Right handed)*
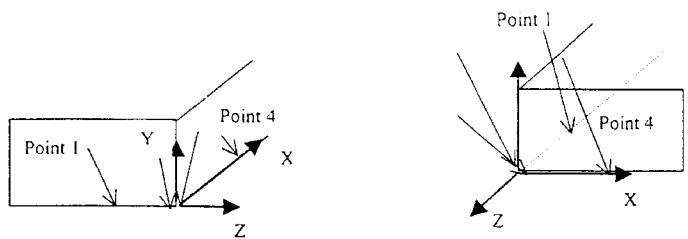
Other Special elements
*Exterior Cylinder*     *Name: WCYL-E-rev*
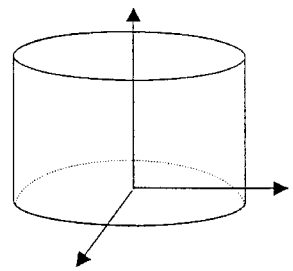
*Interior Cylinder*     *Name: WCYL-I-rev*
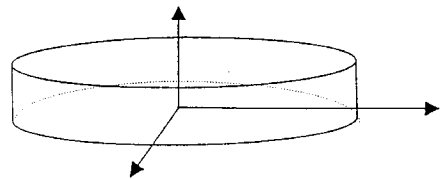
Smart Element Library

*Basic Smart Element template (Data structure)*

Name: User assigned name for this procedure
Class: Type of geometric element (3 surface corner, straight, convex curve, etc.)
Process Type: Welding, Grinding, Cutting, Sensor, Etc.
Process Designation: Depends on Process (E71-T1, E110T1-K3)
Kind: Start, Travel, Termination, and Special
Position: Typical process position (Horizontal, Vertical, Overhead, etc.)
Sensor Link: Defines link to a corresponding sensor procedure, by name (2).
Other: Future requirements
Process ctl: Defines any types of associated real-time process control methods such as: Thru-arc tracking, Adaptive-fill, Adaptive-weave, vision tracking, etc. These attributes are inputs that are used to dynamically develop functions associated with the process control functions. For example, if the Thru-arc attribute is specified, the command planner must set the proper generic command attribute within the weld-on command structure.
Preview ctl: Defines any type of preview sensing control schemas that may be implemented such as: Touch sense, Joint centering, preview-scan, Range probe, etc. These attributes are inputs that are used to dynamically develop functions or associations used by the by the procedure. For example Touch sense will be used for generating an automatic link to a procedure that performs wire touch sensing for this type geometric entity.
V1, V2, V3, Vn: Input control variables used to dynamically tune path plans that are in the form of a geometric equations. For example V1 might be used to specify a wrap distance in a two surface corner weld, start procedure. V2 might specify a snipe dimension and V3 a process direction flag (+1 or –1) (3).
N: 5 [Number of procedure points]
*Data per point record*
Pose: X, Y, Z, WA, TA, other [tool vector pose in terms of X-Y-Z-Work angle-Travel angle]
Offset: X, Y, Z [local tool vector offset to fine tune procedure]
Axis: (+/-X, +/-Y, or +/- Z) [Path orientation control axis]
Command: abc [Generic command types (move, weld-on, approach, probe, etc.) (1)]
Proc Data: A... [Optional data field to convey specific information in regard to command operation. In the case of a sensor point it can provide data in regard to offset buffer processing. In the case of an adaptive weld on point it may specify the association to specific measurement buffer utilization (4)]
Off Buf: N [Optional data field used to manually assign offset buffer associations to specific points (4)]

Notes
1) In a future release the system automatically develop the appropriate command structure and motion attributes based on process and sensor attributes. For now the generic code will reference either weld or adaptive weld schedules. This requires that we know in advance the final position of the weld.
2) In future release, this will be automated based on process and sensor attributes.
3) This flag establishes the direction of the weld with respect to the element datum. Most elements in this document are developed in the +1 direction. If the process is to proceed in the reverse direction this variable should be set to –1.
4) This data is furthered defined in the A-ROPPS functional specification document.

Smart Element Library

A-10

The following example provides a typical template for the 3 surface start element, surface that is illustrated on page 2.

*Designation record*
Name:              W3SC-S-Sur-A
Class;             3 surface corner
Type;              Surface, adjacent
Process Type;      Weld
Process Designation:  E71-T1
Kind;              Start
Position;          Horizontal
Sensor Link;       S3SC-S-Sur-a
Other;             None Process Ctl:       //None specified at this time
Preview Ctl:       //None specified at this time

V1 (wrap distance D); 10
V2 (snipe radius S): 0
V3 (direction Dir); +1

*Process procedure data (Point records)*
N;                4        // 4 points
1. Pose;          15, 10, 10, 45, -20, 0
Offset;           0, 0, 0
Axis;             X
Command;          approach
Proc Data;
OB;
2. Pose;          d, 0, 0, 45, -20, 0
Offset;           0, 0, 0,
Axis;             X
Command;          weld_on
Proc Data;        PT1
OB;
3. Pose;          50, 0, 0, 45, 0, 0
Offset;           0, 0, 0
Axis;             X
Command;          move
Proc Data;
OB;
4. Pose;          150, 0, 0, 45, 10, 0
Offset;           0, 0, 0
Axis;             X
Command;          move
Proc Data;
OB;

Smart Element Library

A-11

Notes on travel direction

3 Surface corner, weld start, illustrated in + direction

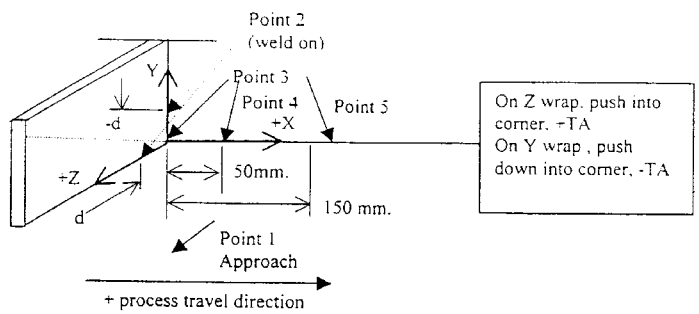

Assumed path plan for the - direction

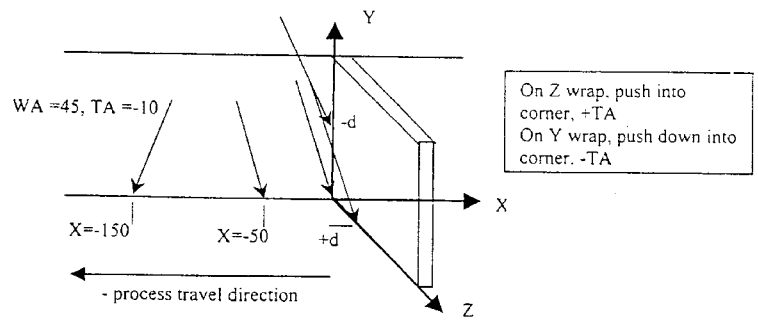

Rules for handling reverse direction processes

1. The datum coordinate system is the same for both forward and reverse process direction
2. In reverse direction mode the sign of the final X coordinate is inverted
3. In reverse direction mode the sign of the travel angle is inverted Smart Element Library

Part II
Sensor elements, baseline library

Sensor Scan Start elements, Typical examples

*Three surface corner type starts*

Input Control Variables
    Same as for related process

3 surface corner    (S3SC-S-Snipe-rev A)
Type: Snipe
This element holds for the following Snipe, s>60
The fillet scan is assumed to be 50 mm long.
The edge scan is assumed to be 40 mm long.

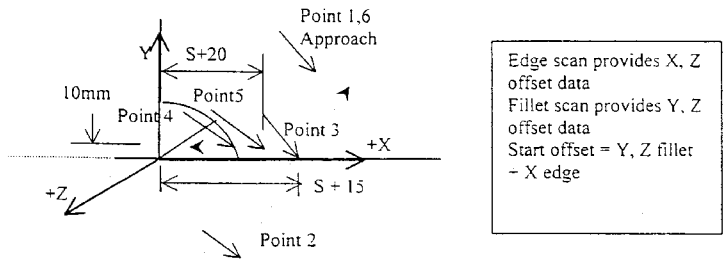

Edge scan provides X, Z offset data
Fillet scan provides Y, Z offset data
Start offset = Y, Z fillet − X edge This element holds for Snipe, s < 30, Surface, PassThru, Wrap
If PassThru and s> 60mm then Probe point Z = s else Z = 55mm.
If Snipe, Fillet scan fillet scan is at s+10 else it's at x = 40mm
The fillet scan is assumed to be 50 mm long.

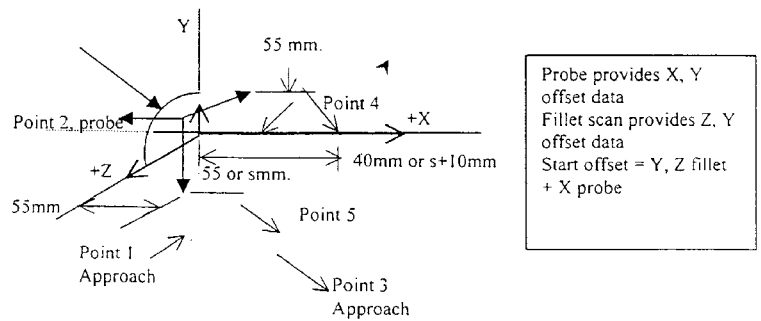

Probe provides X, Y offset data
Fillet scan provides Z, Y offset data
Start offset = Y, Z fillet + X probe Smart Element Library

A-13

*2 surface corner*     S2SC-S-stand-rev
Type: standard or wrap
If d = 0 then a standard corner could be used or points 2 and/or 3 may drop from the plan.
Edge scan = 40mm long, fillet scan = 50 mm long.
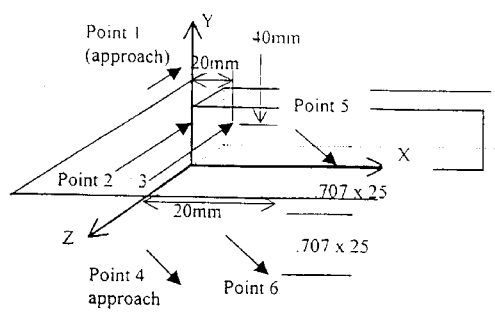
*Snipe*
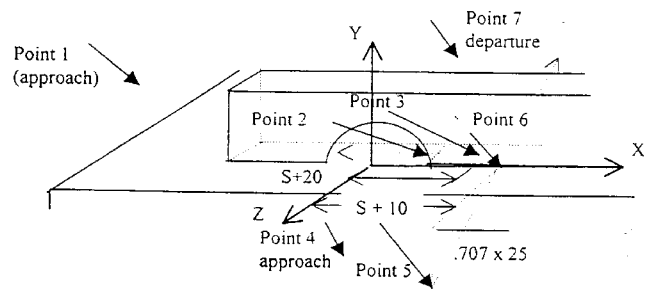
Smart Element Library

Termination elements, sensor
*2 surface termination*
Type: Standard or Wrap
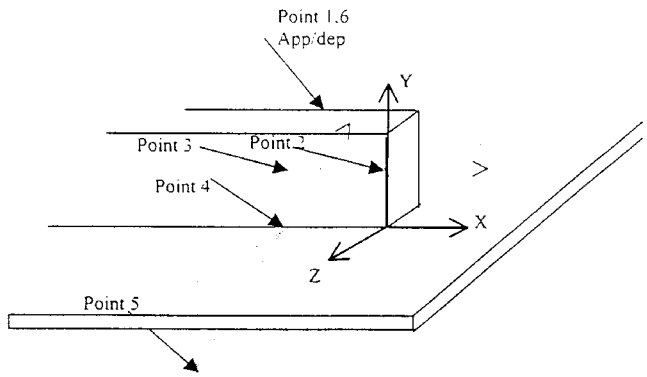
Type: Snipe
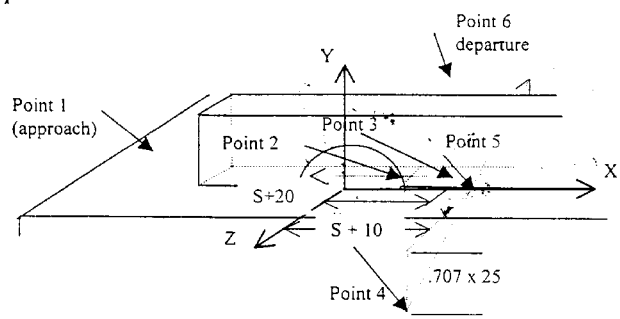
Smart Element Library Example template for 3 surface corner, start element, sensor scan wher 60:
*Designation record*
Name;            S3SC-S-Snipe-A
Class;           3 surface corner
Type;            Snipe
Process Type;    Sensor
Process Designation:  QE
Kind;            Start
Position;        Horizontal
Sensor Link;
Other;           None Process Ctl:     //None specified at this time
Preview Ctl:     //None specified at this time V1 (wrap distance D); 10
V2 (snipe radius S):  65
V3 (direction Dir);   +1

*Process procedure data (Point records)*
N;          6       (just first 4 points illustrated)
Pose;       s+10, 20, 20, 80, 10, 0
Offset;     0, 0, 0
Axis;       X
Command;    approach
Proc Data;  none
OB;
Pose;       s+15, -25*cos(45), 25*cos(45), 45, 0, 0
Offset;     0, 0, 0,
Axis;       X
Command;    profile scan {}, process fillet{}
Proc Data;
OB;         Y, Z
Pose;       s+15, 0, 0, 45, 0, 0
Offset;     0, 0, 0
Axis;       X
Command;    move
Proc Data;  PT1
OB;
Pose;       s, 5, 0, 80, -5, 0
Offset;     0, 0, 0
Axis;       X
Command;    profile scan, process edge {}
Proc Data;  PT1
OB;         X
Etc.

Smart Element Library

We claim:

1. A method of generating a robotic process plan for performing a process on a work structure, the robotic process plan for use in a robotic system that generates robotic kinematics from the robotic process plan, the method comprising:
   a) receiving input identifying a template corresponding to a plurality of geometric features of the work structure, each geometric feature associated with one or more robotic process elements;
   b) receiving input associating work structure data with the identified template,
   c) generating the robotic process plan based on the associated work structure data and the robotic process elements associate with the template.

2. The method of claim 1 wherein the robotic process plan includes a sequence based on sequence data corresponding to the identified template, the sequence data relating to at least two robotic process elements.

3. The method of claim 1 wherein step b) further includes receiving input comprising position and orientation information relating to the work piece.

4. The method of claim 1 wherein step a) further comprises receiving input identifying the template corresponding to the plurality of geometric features such that each geometric feature is associated with one robotic process element.

5. The method of claim 1 wherein step a) further comprises receiving input identifying the template corresponding to the plurality of geometric features such that at least one geometric feature is associated with a plurality of robotic process elements.

6. The method of claim 1 wherein step a) further comprises receiving input identifying the template by selecting the template from a plurality of templates.

7. The method of claim 1 wherein step a) further comprises receiving input identifying the template by selecting the template from a plurality of templates, and wherein the plurality of templates comprising one or more feature templates, each feature template comprising one or more robotic process elements.

8. The method of claim 7 wherein at least one of the one or more feature templates is shared by at least two templates of the plurality of templates.

9. The method of claim 7 where at least one of the one or more robotic process elements is shared by at least two feature templates of the one or more feature templates.

10. The method of claim 1 further comprising the step of d) exporting the robotic process plan to any of a plurality of kinematics generating systems.

11. A system for generating a robotic process plan for performing a process on a work structure, the robotic process plan for use in a robotic system that generates robotic kinematics from the robotic process plan, the system comprising:
   a) a user interface operable to receive input identifying a template corresponding to a plurality of geometric features of the work structure, each geometric feature associated with one or more robotic process elements;
   b) a processor operable to
      receive associated work structure data, the associated work structure data comprising work structure data that is associated with the identified template; and
      generate the robotic process plan based on the associated work structure data and the robotic process elements associate with the template.

12. The system of claim 11 wherein the robotic process plan includes a sequence based on sequence data corresponding to the identified template, the sequence data relating to at least two robotic process elements.

13. The system of claim 11 wherein the processor is further operable to receive associated work piece data comprising position and orientation information relating to the work piece.

14. The system of claim 11 further comprising a storage device operably coupled to the user interface, the storage device including a template database that comprises a plurality of templates.

15. The system of claim 14 wherein each of the plurality of templates of the template database further comprises one or more feature templates, each feature template comprising one or more robotic process elements.

16. The system of claim 15 wherein at least one of the one or more feature templates is shared by at least two templates of the plurality of templates.

17. The system of claim 15 wherein at least one of the one or more robotic process elements is shared by at least two feature templates of the one or more feature templates.

18. The system of claim 11 further comprising a means for exporting the robotic process plan to any of a plurality of kinematics generation systems.

19. The system of claim 18 wherein said means for exporting includes a network connection.

20. The system of claim 18 wherein said means for exporting includes a portable storage medium.

21. The system of claim 11 wherein the input device is further operable to receive template definition input, said template definition input including data defining a second plurality of geometric features of the work structure, each geometric feature associated with one or more robotic process elements.

* * * * *